United States Patent
Berth et al.

(10) Patent No.: US 11,553,686 B2
(45) Date of Patent: Jan. 17, 2023

(54) DEVICE FOR COLLECTION AND REMOVAL OF SLURRY

(71) Applicant: Space Systems ApS, Randers SV (DK)

(72) Inventors: Jorgen Mikael Berth, Randers SV (DK); Niels Christian Berth, Randers SV (DK)

(73) Assignee: Space Systems ApS, Randers SV (DK)

( * ) Notice: Subject to any disclaimer, the term of this patent is extended or adjusted under 35 U.S.C. 154(b) by 58 days.

(21) Appl. No.: 16/968,268

(22) PCT Filed: Feb. 7, 2018

(86) PCT No.: PCT/EP2018/053084
§ 371 (c)(1),
(2) Date: Aug. 7, 2020

(87) PCT Pub. No.: WO2019/154491
PCT Pub. Date: Aug. 15, 2019

(65) Prior Publication Data
US 2021/0029962 A1 Feb. 4, 2021

(51) Int. Cl.
*A01K 1/01* (2006.01)
*A01K 1/00* (2006.01)
*A01K 1/02* (2006.01)

(52) U.S. Cl.
CPC .......... *A01K 1/0103* (2013.01); *A01K 1/0047* (2013.01); *A01K 1/02* (2013.01)

(58) Field of Classification Search
CPC ...... A01K 1/0103; A01K 1/0047; A01K 1/02; A01K 1/011; C02F 2103/20
(Continued)

(56) References Cited

U.S. PATENT DOCUMENTS 140,350 A * 7/1873 Crowther ................ B67C 11/02
                                                            141/299
250,631 A * 12/1881 Fisher ..................... A01K 1/015
                                                           119/527
(Continued)

FOREIGN PATENT DOCUMENTS

CN       109329079 A * 2/2019
DK        176179 B1 * 12/2006
(Continued)

OTHER PUBLICATIONS

International Search Report and Written Opinion regarding PCT/EP2018/053084, dated Aug. 15, 2019.
(Continued)

*Primary Examiner* — Brady W Frazier
*Assistant Examiner* — Zoe Tam Tran
(74) *Attorney, Agent, or Firm* — Polsinelli PC; Ron Galant

(57) ABSTRACT

The invention relates to a device (1) for use in collection and removal of slurry or similar from a sty, a sty comprising such a device and to a method of installing a device at a sty, such as a pig sty, wherein the device comprises an one-piece body (2) having one or more funnels (3) wherein each funnel comprises at least one upper opening (3*a*) having an upper horizontal area enclosed by an upper edge (3*a*') and a lower opening (3*b*) having a lower horizontal area enclosed by a lower edge (3*b*'), wherein the upper horizontal area is larger than the lower horizontal area, and the inside (3') of the funnel is thus extending from the upper opening to the lower opening of the funnel, an encapsulation (4) enclosing the funnel from the lower edge of the funnel to the upper edge of the funnel, such that a ventilation space (5) is defined within the one-piece body between the encapsulation and the funnel.

20 Claims, 8 Drawing Sheets

(58) Field of Classification Search
USPC .......................................................... 119/527
See application file for complete search history.

(56) References Cited

U.S. PATENT DOCUMENTS

| | | | | |
|---|---|---|---|---|
| 1,842,016 | A * | 1/1932 | Foley | B22D 7/06 249/108 |
| 4,227,486 | A * | 10/1980 | Kaufman | A01K 1/0103 119/447 |
| 5,666,905 | A * | 9/1997 | Mackin | A01K 1/0047 119/448 |
| 5,732,658 | A * | 3/1998 | Wolters | A01K 1/0103 119/450 |
| 5,890,454 | A * | 4/1999 | Moore, Jr. | C02F 1/66 119/447 |
| 6,321,687 | B1 * | 11/2001 | Lemmon | A01K 1/0047 119/448 |
| 7,491,265 | B1 * | 2/2009 | Johnson | A01K 1/01 96/121 |
| 2004/0079040 | A1 * | 4/2004 | MacLean | E04F 19/10 52/302.1 |
| 2016/0278520 | A1 * | 9/2016 | Dawson | B25H 3/04 |
| 2016/0316712 | A1 * | 11/2016 | Kratzer | A01K 1/0151 |

FOREIGN PATENT DOCUMENTS

| | | | |
|---|---|---|---|
| DK | 176179 | B1 | 12/2006 |
| DK | 200600101 | U3 | 7/2007 |
| JP | S56-077270 | U | 6/1981 |
| JP | S58-016060 | U | 2/1983 |
| JP | S61-209536 | A | 11/1991 |
| JP | H09-508785 | A | 9/1997 |
| JP | H01-168151 | U | 1/1999 |
| KR | 200432848 | Y1 * | 12/2006 |
| NL | 9202114 | A * | 7/1994 ........... A01K 1/0103 |
| NL | 9202114 | A | 7/1994 |
| WO | 2018029146 | A1 | 2/2018 |

OTHER PUBLICATIONS

Chinese First Office Action dated Jan. 6, 2022 for corresponding Chinese Patent Application No. 201880088663.X (English translation).

Communication pursuant to Article 94(3) EPC issued in corresponding European Patent Application No. 18707855.5 dated Jan. 18, 2022.

Japanese Office Action issued in corresponding Japanese Patent Application No. 2020-542260 dated Dec. 2, 2021 (English translation).

* cited by examiner

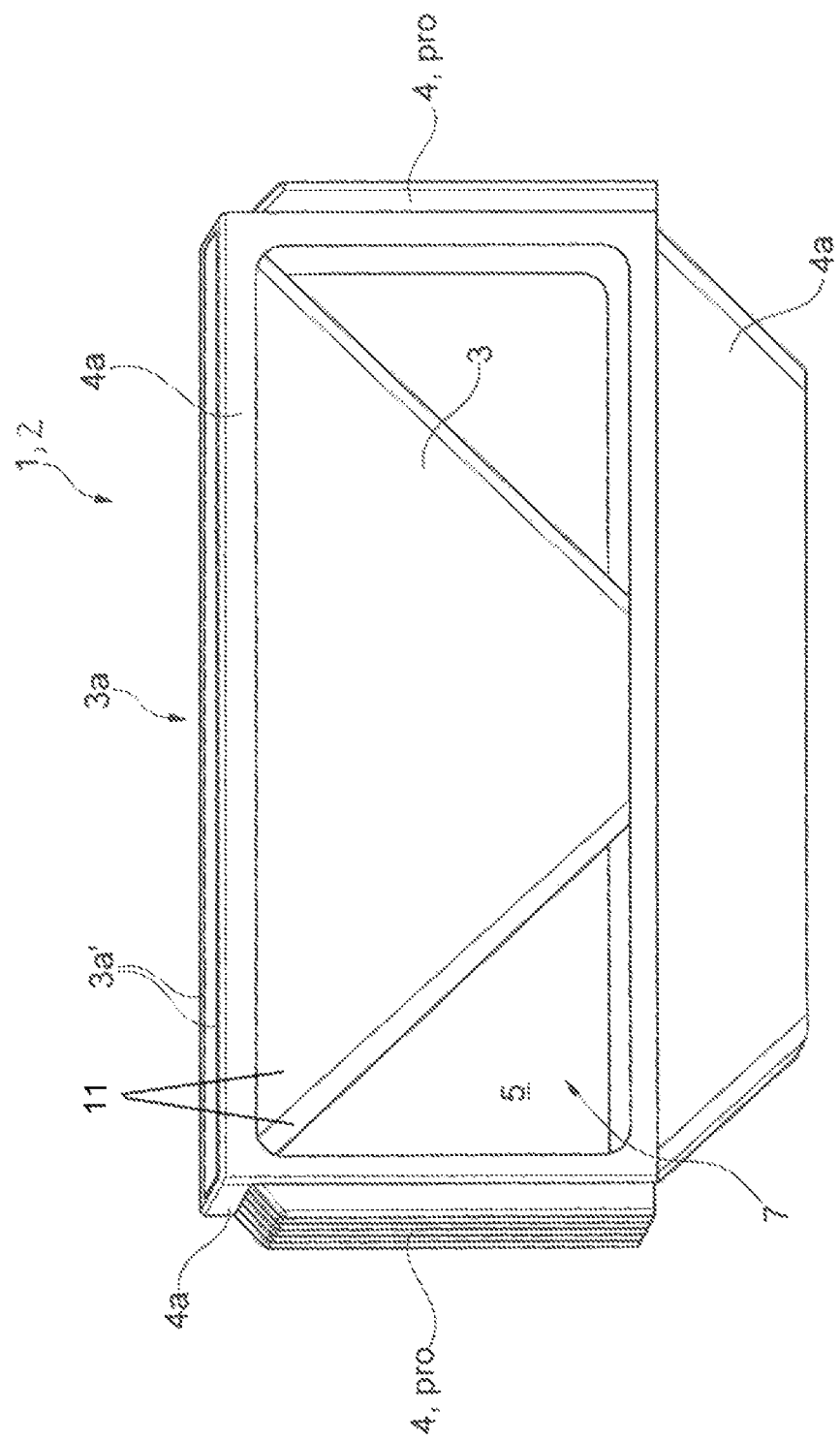

DEVICE FOR COLLECTION AND REMOVAL OF SLURRY

The invention relates to a device for collection and removal of slurry, to a sty comprising such a device and to a method of installing such a device.

BACKGROUND

In this disclosure slurry is defined as all kinds of animal waste such as excrements, faeces, urine, manure and left over litter, animal feed, water etc. It is generally preferred that slurry is at least partially removed, from the sty in order to maintain a reasonable level of hygiene and to reduce the concentration of polluting element in the air in particularly of evaporated ammonia.

Within animal production, especially within pig farming, it is desired to produce a system which effectively removes slurry from the sty, improves the air quality within the sty and which at the same time is cheap to produce, easy to install and environment-friendly.

Traditional devices used for collection and removal of slurry mainly comprise openings such as pits under the floor level of the sty, wherein the slurry is collected and led away. The slurry may be located in these pits for a long period of time and these open pits provide a large surface area and usually result in a high level of slurry evaporation, causing high level ammonia in the air. Furthermore the reduced amount of nitrogen in the slurry causes it to have reduced fertilizing properties. The pits are usually covered by grid floor, making it difficult to provide the sty with straw, whereby the wellbeing of the pigs is decreased. Presently, it is therefore required that at least some of the floor in a pig sty is a solid floor and only ⅓ of the sty area comprises a grid floor.

The system described in the document DK 176179 B1 seek to improve the air quality within the sty. The document describes a system comprising a number of funnels. The pyramid shape of the funnel reduces the surface area of the slurry when located in the funnel compared to using a traditional slurry pit. The pyramid shape also promotes a faster transportation of the slurry to a pipe system in the floor of the pit. Furthermore the funnel is made of HDPE plastic, providing a low friction force on the slurry, further promoting a faster removal of the slurry. The funnels are connected to the pipe system through protruding pipe sections in the floor of the pit. The device is therefore assembled in the pit. Two rows of funnels are usually installed together, with a space between them which is used as a ventilation space. For that purpose, an opening in one side of the funnel is provided, through which air can flow. The funnels are supported by using support legs and by resting the funnel up against one of the side walls of the pit.

One object of the invention is to provide a device and a sty with the device which comprises means for optimum and effective collection and discharge of slurry from the sty. A second object of the invention is to improve the air quality within the sty and reduce the amount of ammonia evaporated into the air. Another object of the present invention is to provide a device and a sty with a device which has a more compact and simplistic design, which reduces the material, fabrication and installation costs. A further object is to provide a device and a sty with the device which can be prefabricated and installed as ready-made device, thereby minimizing the amount of elements which needs assembling upon installation. An object of the present invention is also to provide a device of high quality, which is durable and self-supported.

BRIEF DESCRIPTION OF THE INVENTION

The first aspect of the present invention relates to a device for use in collection and removal of slurry or similar from a sty, such as a pig sty, wherein the device comprises an one-piece body having
- one or more funnels wherein each funnel comprises at least one upper opening having an upper horizontal area enclosed by an upper edge, and a lower opening having a lower horizontal area enclosed by a lower edge, wherein the upper horizontal area is larger than the lower horizontal area, and the inside of the funnel is thus extending from the upper opening to the lower opening of the funnel,
- an encapsulation enclosing the funnel from the lower edge of the funnel to the upper edge of the funnel, such that a ventilation space is defined within the one-piece body between the encapsulation and the funnel.

Advantageously, the device comprises a passageway for the slurry, from the upper opening of the funnel to the lower opening funnel. The funnel may effectively collect the slurry as it enters through the upper opening and the funnel may effectively discharge the slurry as the slurry falls toward the lower opening of the funnel and towards the outside of the device due to gravitational force. The passageway for the slurry may be defined in the centre of the device.

The funnel may be of a frustum square pyramid shape, or be shaped as frustum cone or hexagonal pyramid. Advantageously, a frustum of a cone comprises less corners than e.g. a square pyramid shape, which may further reduce the occurrence of slurry sticking to the inside surface of the funnel. Advantageously, the funnel may provide a significant decrease in surface area of the slurry and a decrease in the time spent in the funnel will in turn decrease the amount of ammonia evaporated, improving the air quality within the sty.

Advantageously, the device is self-supporting and may simply be placed on any surface when installed. There is no need for concrete channel underneath the device, it can simply be placed on the bottom of the sty opening, such as tamped sand bottom, with the upper opening directed towards the animals within the sty.

Several parts of the device can be pre-fabricated, such that the labour required for installation of the device is minimized along with the installation cost. The prefabrication of the device furthermore makes it possible to fabricate the device to a high standard since it is possible to quality check the device, such as making sure that the funnel is water proof and that the device is generally free of any fabrication errors, prior to installation. All parts of the device may be pre-fabricated, such that no parts of the device are fabricated on site and the device may be fabricated to a level such that a minimum amount of the parts needs to be assembled on site.

As the body of the device is manufactured as a pre-fabricated one-piece device provides seamless and continuous leak-free structure which provides a hollow interior which is advantageously provides a built-in ventilation space for the device. A large portion of the device may advantageously be utilized as a ventilation space and furthermore the ventilations space may advantageously defined around the entire outside surface of the funnel, due to the encapsulation. Prior installation of the device, ventilation holes may be provided in the encapsulation and/or the funnel so that air can be extracted from and supplied to the living quarters of the animals through the ventilation space. The large extent of the ventilation space advantageously provides the opportunity to extract air at locations within the sty where it is needed the most, thereby increasing the overall efficiency of the ventilation.

A plurality of device and the corresponding plurality of ventilation spaces may be connected to provide a common ventilation channel. The ventilation channel may be in connection with ventilations means which can provide ventilation of the air in the channel. Ventilation holes may be provides in the one-piece unit so that air may be extracted from the sty and directed through the ventilation channel.

Advantageously, the device can be used for an environment-friendly animal production as the device provides minimal environmental impact and a high level of animal welfare as slurry can be discharge in a fast and efficient manner while reducing the evaporation of ammonia to very low levels. The increase in animal welfare in turn reduces the level of medication that the animals might need, which increases the economic benefits of the device.

In one or more embodiments, the lower opening is configured to be connected to an outlet pipe, such that a sealed pathway for slurry is provided from the funnels to the outlet pipe.

The outlet pipe may comprise one or more outlet openings in the surface thereof, or at a distance from the surface thereof, extended by a pipe section. In one or more embodiments, the outlet pipe may comprise a plurality of pipe section extending perpendicular to the surface thereof and providing a sealed path way from a distal end of the pipe section comprising an opening and to the interior of the outlet pipe. The distal end of the pipe section may be configured to be connected to the lower opening of the funnel, such as by using a coupler. The opening in the pipe section may be circular, and additionally the lower opening of the funnel may also be substantially circular in shape.

In one or more embodiments, the funnel comprises one or more ventilation holes arranged near the upper edge of the funnel.

The positioning of ventilation holes near the floor level of the living quarters of for the animals, advantageously allows the air closest to the source of ammonia evaporation to ventilated and directed away from the animals within the sty. Ventilation means may preferably be provided so that the ventilation space may be ventilated such as by means of air extraction and air supply.

In one or more embodiments, the ventilation holes may be distributed in more than two parts near the upper edge of the funnel, i.e. in for example near three parts of the upper edge, or near substantially the entire circumference of the upper edge, which is possible due to the ventilation space created between the encapsulation element and the funnel which may extend around substantially the entire outer surface of the funnel. The ventilation openings provide pathways through which air can flow, preferably between the inside of the funnel and the ventilation space. The ventilation openings may be of any suitable size and shape, and may e.g. be approximately 2-8 cm in length measured a long a direction from the upper to the lower opening of the funnel and 5-20, such as 10-18 cm in width measured along the upper edge of the funnel.

In one or more embodiments, the device comprises at least one ventilation opening in the encapsulation, for allowing air to flow between the one or more ventilations holes and the ventilation opening.

Air may preferably be allowed to flow between the ventilation holes and one or more ventilation openings in connection with suitable ventilation means. The ventilation space may be a part of a ventilation channel made up may a series of devices placed in succession and each proving a ventilation space. The ventilation channel is preferably in connection with ventilation means.

Advantageously, ammonia evaporated from the upper surface of the slurry in the funnel will be removed from the sty via the ventilation holes and the ventilation space 5, which may be connected to a ventilation arrangement (not shown) with an air treatment system to remove the content of ammonia. Air may also be extracted near the upper edge of the funnel from the floor level of the sty so as to reduce the ammonia content in the air near the sty floor and the animals in the sty.

In one or more embodiments, at least some of the ventilation holes are covered by one or more cover elements, so as to prevent slurry or similar from entering the ventilation space through said ventilation holes.

The device may be supplied by one or more cover elements configured to create a barrier between the slurry and the ventilation holes when slurry enters through the upper opening of the funnel. In one or more embodiments a part of the encapsulation is separated from the remainder of the encapsulation, so as to create a ventilation opening, and this part may advantageously be configured to be usable as a cover element for preventing slurry from entering the one or more ventilation holes.

In one or more embodiments, the encapsulation may be made of a structural rigid material, so that the encapsulation may additionally act as a support structure for the remainder of the device.

In one or more embodiments, the device is made of a plastic material, preferably comprising High Density Polyethylene (HDPE) material.

The encapsulation may be made of a plastic material, such as HDPE and provide the necessary structural support for the remainder of the device, and advantageously provide a device which is self-supporting. HDPE plastic is a high-strength, lightweight and environmentally friendly material, which therefore may provide a device which is easier to install due to its lower weight and which may be made using a minimum amount of material while still being stable enough to handle the slurry. Furthermore, advantageously HDPE is a low adhesion material, having surface on which the slurry and manure readily can slide and HDPE is very resistant to the environment of the sty, including a high content of ammonia. The sheet material may preferably approximately 10 mm in width, measured from the inside surface to the outside surface. The HDPE material may additionally have hardness of 60-70 shore D.

In one or more embodiments, at least the one-piece body is made of HDPE but preferably the entire device is made of the same plastic material, such as HDPE. The funnel and encapsulation are preferably made of HDPE. Any passageway, such as a pipe, through the device, in which slurry can flow away from the funnel, from the lower opening of the funnel to the outside of the device may preferably also be made of the same plastic material as the encapsulation and the funnel.

Advantageously, an efficient discharge of slurry can be provided. As soon as the slurry enters the pipe unit, the evaporation of ammonia is significantly reduced due a smaller surface area of slurry in contact with the air. It is therefore an object to allow the slurry to enter the pipe unit as fast as possible to reduce the overall evaporation of ammonia.

Even with a large presence of hay and even though the slurry is rapidly discharged from the funnel, the slurry will be prevented from sticking to the inner sides of the funnel due to the low adhesion properties of the HDPE material.

In one or more embodiments, the one-piece body is made by a rotational moulding manufacturing process.

The device may preferably be made using a rotational moulding process. Typically in such a process the plastic material is placed in the mould, which is then heated and rotated so as to disperse and distribute the softened plastic material on the inner surfaces of the mould creating the desired shape. This process is advantageous as it can provide a device which is a single unit being seam-less is the sense that due to the manufacturing process the unit is free of joints welded or glued together. As a further advantage, a finished device made using rotational moulding process generally comprises lower levels of residual stresses compared to structures fastened or welded together, making the one-piece device increasingly sturdy. Moreover the process is generally fast and produces very low levels of material waste, which in turn make the device cost efficient and environment-friendly.

In one or more embodiments, the funnels comprises an inner surface of an angle of inclination from vertical (A1) in the range of 30-60 degrees, and preferably in the range of 40-50 degrees.

An angle within these ranges of angles is advantageously large enough to provide a fast transportation of the slurry, due to the force of gravity, towards the pipe unit. At the same time the angle is small enough to maintain a relatively small horizontal extent of the slurry in the funnel. Especially for sows, there may be a large presence of hay in the sty and the angle of inclination (A1) allows hay to be sufficiently discharged from the funnel to the outlet pipe, and sufficiently prevents the funnel to be partly or fully blocked. Furthermore, hay and slurry adhering to the sides of the funnel can cause a significant increase in contaminant in the air, decrease the air quality within the sty. The angle of inclination as defined above significantly increases the efficiency of the removal of slurry and hay and reduces the occurrence of adhering and blocking hay and slurry.

In one or more embodiments, the one-piece body comprises at least two funnels and wherein the funnels are arranged side by side such that at least a part of the upper edge of the first funnel is neighbouring at least a part of the upper edge of the second funnel.

In one or more embodiments, the encapsulation extends from the lower edges of the funnels to the upper edges of the funnels but not to the neighbouring upper edges which preferably are already connected after manufacturing the one-piece unit and thereby eliminated openings between the outside of the one-piece body and the ventilation space. Ventilation hole may subsequently be provided between the neighbouring edges if ventilation is needed at that position.

In one or more embodiments, the encapsulation comprises a plurality of protrusion on the outer surface thereof for maintaining gap of a minimum distance (D) between the outer surface of the encapsulation and neighbouring elements such as neighbouring devices.

Advantageously the protrusion may provide additional strength and stability to the one-piece body structure and act as a reinforcement of the structure. The gap may provide a minimum distance between the outer surface of the encapsulation and any structure, which is not flexible or capable to enter the gap between the protrusions, such as a planar structure, e.g. a wall, such as the side walls of the sty opening.

In one or more embodiment the protrusions may be hollow, reducing the overall weight and material use for the one-piece body. They may alternatively be solid so as to provide an encapsulation which is even more study.

In one or more embodiments, the protrusions may have any shape, such as a rounded or elliptical shape, but they may preferably be of a rectangular surface shape with a flattened tip of the protrusion. The maximum distance from the tip of the protrusion on the outer surface to the outer surface of the encapsulation may be between 3-10 cm such as between 4-8 cm. The protrusions may be separated from each other along the width or thickness of the encapsulation by a separation distance between 10 and 20 cm. In one or more embodiments, the protrusions may be spaced a distance S from each other, where S is substantially equal to ⅓-2 times the width of the protrusions.

In one or more embodiments, two or more devices may be arranged such that said protrusions of each device are arranged in opposing configuration, whereby gap corresponding to approximately twice the minimum distance (D) may be provided between the devices. This gap may be utilized as a mould for creating a concrete support structure or a mould for creating a barrier of any other material between the devices. Advantageously, the protrusions on the outer surface of the encapsulation increases the overall surface area for adhesion to the concrete or other adhering material.

In one or more embodiments, by arranging the devices such that the protrusions are opposing an outer surface of the neighbouring the device, the devices may be brought into an abutting configuration, which may be utilized for minimizing the space occupied by the devices, prior to installations especially when the devices are to be transported. Furthermore, merging the protrusions of the devices advantageously stabilises the arrangement of the devices.

In one or more embodiments, the side of the encapsulation may be manufactured to comprise a surface shape different from a planar surface such as a surface shape comprising different and/or alternating surface heights, measured with respect to the average surface height, along the horizontal extent or vertical extent or both of the side of the encapsulation, such as resembling a waving surface shape. The surface shape may preferably provide a gap, of a distance D as described above.

Additionally or alternatively, the lower part of the encapsulation, near the lower opening of the funnel, may be of a smaller in transverse area than the transverse area of the upper part of the encapsulation near the upper opening of the funnel, such that a least a lower part of the encapsulation of a first device according to the invention may fit into an upper part of a funnel of a second device according to the invention. This allows the first and second device to be readily stacked on top of each, in which configuration the second device encloses a lower part of the first device, allowing the volume they occupy prior to being installed to be minimized in the longitudinal direction which in turn reduces cost of storage and transportation.

In one or more embodiments the upper transverse area of the encapsulation is substantially equal to the upper transverse area of the funnel.

In one or more embodiments, the lower opening and upper opening each comprises a centre, wherein the centre of the lower opening is located at a distance Z, measured perpendicularly from the centre axis of the funnel, wherein the centre axis of the funnel extends perpendicular to the extent of the upper opening and through the centre of the upper opening.

The extent of the upper opening of the funnel is preferably perpendicular to the centre axis of the funnel. The extent of the lower opening of the funnel may preferably also be perpendicular to the centre axis of the funnel.

In one or more embodiments, the maximum width of said device comprising a single funnel is approximately between 1.0-1.8 m such as between 1.1-1.7 m or such as approximately between 1.2-1.5 m.

The width of the device is measured along a line perpendicular to the centre axis of the funnel. A device comprising two funnels is approximately twice as wide, such that the device is of a width between approximately 2.0-3.6 m, such as between approximately 2.2-3.4 m or such as between approximately 2.4-3.0 m.

In one or more embodiments, the maximum thickness of said device comprising a single funnel is approximately between 1.0-1.8 m such as between 1.1-1.7 m or such as approximately between 1.2-1.5 m.

The extent is measured as the maximum thickness of the funnel at the upper edge of the funnel. The thickness of the device is measured along a line perpendicular to the centre axis of the funnel and perpendicular to the line along which the width is measured. In one or more embodiments, a device comprising a single funnel may be of a width which is substantially equal to the thickness of the device.

The relative small transverse extent of the funnel means that several funnels can be arranged side by side, each connected to individual outlet openings in the same outlet pipe. This large number of discharge pathways in the sty, wherein the slurry can reach to the outlet pipe through a large number of outlet openings, may provide a more efficient discharge system wherein the slurry may be more rapidly discharged to the outlet pipe.

In one or more embodiments, the maximum height of the device is between approximately 0.7-1.8 m, such as between approximately 0.9-1.6 m or such as approximately between 1.1-1.5 m.

The height is measured as the vertical extent measured from the lower area of the funnel to the upper area of funnel in the vertical plane. The slurry is preferably transported less than a meter to the lower opening of the funnel and thereby the outlet pipe(s), such that the evaporation may only occur in the first meter below the floor level of the sty.

In one or more embodiments, the height of the funnel depends of the horizontal extent (B1, B2) of the lower opening 3b and the upper opening 3a, in that the inclination of the funnel sides from horizontal is preferably between 35-55 degrees such as 40-50 degrees or such as 45 degrees.

In one or more embodiments, the device comprises plate structure attached at one end to a first part the inner surface of the funnel and attached at a second end to a second part of the inside of the funnel so as to enclose a cavity between said plate structure and said enclosed part of the inside of the funnel, wherein the cavity is configured to be used as an air channel for directing fresh air supplied from the outside of the funnel to the inside of the funnel, through the cavity and towards the upper opening of the funnel.

An air supply hole may preferably be provided in the enclosed part of the inside of the funnel, so that air may be provided from the outside, through the ventilation space, such as through a pipe and to the air supply hole and towards the upper opening funnel. The plate structure, may comprise one or more planar elements, such as planar elements made of HDPE. Preferably the plate structure is shaped so as to sufficiently direct the air towards a small area of the upper opening of the funnel, preferably to an area adjacent to the areas of the sty where the animals tend to rest, or at least where they tend to place their heads upon resting. The plate structure may for example be shaped as a funnel, such as a cone shaped funnel or a funnel cut along the longitudinal length of the funnel and attached to the inner surface of the funnel.

Preferably, prior to installing a device in an opening of a sty, ventilations holes and/or ventilations openings may be provides to the ventilation space so that suitable ventilation means may be arranged in fluid connection to said ventilations space. The device is preferably installed at a sty below the living quarters of the animals so that slurry can fall into the device and be collected by the funnel and thereafter by an outlet pipe connected to the lower opening of the funnel at the bottom of the device, through which pipe the slurry may be further transported away from the sty.

In one or more embodiments, after fabrication of the device and prior to installation, the encapsulation connects substantially the entire upper edge of the funnel to substantially the entire lower edge of the funnel, thereby eliminating any entry points into or out from the ventilation space of the device. Thereby the ventilation space is kept clean and the ventilation holes may be provided in areas suitable for the individual sty in which the device is to be installed.

The second aspect of the invention relates to methods for installing the device according to embodiments described in relations to the first aspect of the invention.

A first embodiment of the second aspect of the invention relates to a method of installing a plurality of a device in a sty opening at a sty, such as a pig sty, wherein each device comprises an one-piece body having one or more funnels wherein each funnel comprises at least one upper opening having an upper horizontal area enclosed by an upper edge, and a lower opening having a lower horizontal area enclosed by a lower edge, wherein the upper horizontal area is larger than the lower horizontal area, and the inside of the funnel is thus extending from the upper opening to the lower opening of the funnel, an encapsulation enclosing the funnel from the lower edge of the funnel to the upper edge of the funnel, such that a ventilation space is defined within the one-piece body between the encapsulation and the funnel, and wherein the method comprises the steps of installing an outlet pipe in the sty opening, and
connecting said lower opening of each funnel with an outlet pipe, such that a sealed pathway is created between the funnel and the outlet pipe.
separating a section of the encapsulation from the remainder of the encapsulation for each device, so as to provide a ventilation opening,
providing one or more ventilation holes near the upper edge of the funnel of at least some of said devices, so that air may be transported between the sty and the ventilation space,
placing said plurality of devices side by side near the bottom of the sty opening, such that a ventilation channel comprising the ventilation spaces of said devices is provided.

A second embodiment of the second aspect of the invention relates to a method of installing embodiments of the device according to the first aspect of the invention, wherein ventilation hole(s) and ventilation opening(s) are provided in the device prior to installing the device, e.g. at the manufacturing facility. Thus the method of installing a plurality of a device according to embodiments in the first aspect of the invention in a sty opening at a sty, such as a pig sty, may comprise the steps of installing an outlet pipe in the sty opening, and
connecting said lower opening of each funnel with an outlet pipe, such that a sealed pathway is created between the funnel and the outlet pipe.
placing said plurality of devices side by side near the bottom of the sty opening.

Advantageously, according to the present embodiment, the device is fabricated and delivered as ready-made device at the sty and may simply be connected to the outlet opening in the sty opening. Additionally a solid floor or a slatted floor, preferably a combination of both is installed in sty, covering the devices.

The present embodiment may further comprise one or more or all of the following steps of separating a section of the encapsulation from the remainder of the encapsulation for each device, so as to provide a ventilation opening,
providing one or more ventilation holes near the upper edge of the funnel of at least some of said devices, so that air may be transported between the sty and the ventilation space,
placing said plurality of devices side by side near the bottom of the sty opening such that a ventilation channel comprising the ventilation spaces of said devices is provided.

In one or more embodiments according to the second aspect of the invention, the device may preferably be installed under the floor level of a sty. The outlet pipe may comprise a plurality of outlet opening in the surface thereof which the lower opening of the device may be connected to. Additionally, a pipe section may be installed and connected between the lower opening of the device and the outlet openings in the surface of the outlet pipe.

The outlet pipe may be installed under the floor level of the sty opening. The sty opening may be an already existing sty opening, such as a traditional slurry pit. The outlet pipe may be installed under the floor level of the slurry pit or it may be installed placed on the floor level of the slurry pit and maintained in this position by suitable means, such as by using a support frame or such as by sufficiently covering the slurry by gravel or sand, while leaving the outlet pipe openings exposed so that they may be connected with the device. The outlet pipe openings may be in connection with a pipe section creating a sealed pathway between the pipe section and the outlet pipe. The lower opening of the funnel may be configured to be connected to the pipe section or directly to the outlet opening of the outlet pipe, e.g. if no intermediate pipe section is present.

In one or more embodiments an outlet pipe is placed so that it has an inclination (A2) from horizontal of at least 0.1%, preferably between 0.1-0.5%, in the longitudinal direction arranged to promote a flow away from the lower openings of the funnels.

The devices are preferably placed in a configuration such that the ventilations openings of the devices are in an opposing arrangement, e.g. such that they are abutting and may be sufficiently attached to one another through suitable fixing means, such as by welding or gluing the abutting parts together, such as abutting parts of the encapsulation. The devices are preferably arranged such that the individual ventilation spaces of the device provide a common ventilation channel.

In one or more embodiments, the method may further comprise the step of attaching a part of said section of the encapsulation near said upper edge of the funnel such that said section of the encapsulation covers at least some of said ventilation holes of the device.

Advantageously, the encapsulation material removed to provide a through-going channel in the device, may be re-used to provide a cover for the ventilation holes, such that slurry is prevented from entering the ventilation holes, and thereafter the ventilation space from above, e.g. from the sty floor area. Less material needs to be disregarded, and overall the device reduces material waste and thereby the cost of production.

In one or more embodiments, the method may further comprises the step of connecting said devices by means of suitable fastening methods, such as by gluing or welding the devices together, such as to provide a substantially sealed ventilation channel.

Additionally to simply placing the ventilation spaces adjacent to each other, preferably in an abutting arrangement, the abutting parts of the encapsulation may be fixed together, securing the relative position of the devices and also reduce the occurrence of contaminants in the ventilation channel.

In one or more embodiments, the encapsulation may comprise a plurality of protrusion on the outer surface thereof, which provides a gap of minimum distance D between the outer surface of the encapsulation and neighbouring elements when installed at a sty, such as neighbouring devices or side walls of the sty opening and wherein the method comprises the step of filling the gap with material, such as concrete, in order to provide a rigid structure and so as to fix the device in the installed position.

The gap may be provided between side walls of the sty opening and the outer surface of the encapsulation and by filling the gap with a material adhering the two parts together may result in fixing the device in the desired position. The gap may also be provided between neighbouring devices and may be utilized as form for providing an adhering material, such as concrete, between the neighbouring devices. The material may preferably provide a rigid structure which may be used as support structures between the devices.

In one or more embodiments, the method may comprise the step of placing at least one floor having a plurality of through holes and placed over the upper opening of the funnels of said devices. The floor may be a slatted floor, having a plurality of slits, providing openings from living area of the animals in the sty and the device. The slits may have alternating sizes, some may be wider than others. The widest slits may preferably be placed near places of the sty where the largest amounts of manure may be deposited.

In one or more embodiments of the second aspect of the invention, the method comprises the step of placing at least one floor having a plurality of through holes over the upper opening of the funnels of said devices, such that the at least one floor is supported by at least some of the rigid structures such that the weight of the floor and the load on the floor are transferred to the rigid structures.

The third aspect of the invention relates to a sty for animals, such as pigs, wherein the sty comprises a device according to any of the embodiments according to the first aspect of the invention installed in a sty opening of the sty using a method of installation according to any of the embodiments according to the second aspect of the invention.

The sty may comprise a sty floor at the ground level of the sty, below which the devices are installed at an opening in the sty floor, such that when animals at the ground floor of the sty deposit slurry or manure, this will be transferred to the interior of the funnels placed beneath.

In one or more embodiments, the size and shape of the enclosure of the sty need not to correspond to the size and shape of the device(s) installed under the floor level of the sty. That is a wall of the sty, separating one enclosure from another, may be positioned across an upper opening of a funnel within the device, providing the possibility of collecting slurry from both neighbouring enclosures. Additionally or alternatively, at least parts of the devices may be covered by a solid floor, with no through holes.

In one or more embodiments, one or more of the devices installed in the sty may comprise a crooked longitudinal shape along the centre axis of the funnel, in the sense that the lower opening of the funnel is off-set laterally (may be in any direction in the horizontal plane) by a distance Z from the centre axis of the upper opening extending perpendicularly through the extent of the upper opening through the centre of the upper opening, such that inside of the funnel comprises a change angle of inclination around the centre axis of the funnel. Steep sections of the inside of the funnel may be position underneath areas of high occurrence of slurry such that the slurry is rapidly directed towards the outlet pipe, while the most flattened areas of the inner surface of the funnel may be positioned near areas where less slurry occurs such as areas where the animals tends to rest their heads.

Additionally or alternatively the device may comprises plate structure attached at one end to a first part the inner surface of the funnel and attached at a second end to a second part of the inside of the funnel so as to enclose a cavity between said plate structure and said enclosed part of the inside of the funnel, wherein the cavity is configured to be used as an air channel for directing fresh air supplied from the outside of the funnel to the inside of the funnel, through the cavity and towards the upper opening of the funnel.

An air supply hole may preferably be provided in the enclosed part of the inside of the funnel, so that air may be provided from the outside, through the ventilation space, such as through a pipe and to the air supply hole and towards the upper opening funnel. Preferably the plate structure is shaped so as to sufficiently direct the air towards a small area of the upper opening of the funnel, preferably to an area adjacent to the areas of the sty where the animals tend to rest, or at least where they tend to place their heads upon resting.

In one or more embodiments an outlet pipe is connected to the lower opening(s) of the funnel(s) with an inclination (A2) from horizontal of at least 0.1%, preferably between 0.1-0.5%, in the longitudinal direction arranged to promote a flow away from the lower openings of the funnels.

The outlet may preferably provide a transportation of slurry away a plurality of lower openings of funnels connected to the outlet pipe, so as to lead the slurry away from the sty areas. In order to promote the transportation of slurry the outlet pipes may be installed in the sty openings with an inclination from horizontal, such that slurry naturally flows in a predetermined direction due to the gravitational force acting of the slurry. The slurry may be led to container at which they material can be stored or processed.

In one or more embodiments, at least some of said devices are covered by at least one floor having a plurality of through holes and placed over the upper opening of the funnels of said devices.

In one or more embodiments, the through holes of the floor may have different widths, allowing more or less material to pass down through the holes. In one or more embodiments, the floor may comprise holes being of increasing widths from one end to the opposite end of the floor. Additionally or alternatively, the floor may comprise holes which at one part, such as ⅓ of floor, such as near the end part of the floor, comprises a few narrow holes, such that the holes make up approximately 5-30% of said part of the floor. The remaining ⅔ of the floor may comprise larger and/or a larger number of holes such that the holes make up 25-60% of the floor.

The slatted floor may be made of cast iron, or plastic, such as reinforced plastic.

The device may alternatively be partly covered with traditional concrete floor, allowing the sty to have the optimum area of solid concrete floors to slatted floors having a number of through-going holes.

In one or more embodiments, the sty comprises a plurality of rigid structures arranged on two opposite sides of each device. In one or more embodiments, the at least one floor is supported by at least some of the rigid structures such that the weight of the floor and the load on the floor are transferred to the rigid structures.

In one or more embodiments, two devices may be installed next to each other, with the side comprising said protrusions opposing each other, and concrete may be filled in the space between the devices whereby a rigid structure is created. This rigid structure may advantageously be utilized as a support structure for floor(s) placed over the devices. The rigid structures may be made of concrete.

In one or more embodiments, the rigid structures are made of sheet material, preferably High density polyethylene (HDPE) plastic, whereby the rigid structures are lightweight while still being rigid so as to sufficiently support a floor and/or the device. Additionally, the support structures may comprise a hollow interior and be filled with sand upon installation.

The invention furthermore relates to a building comprising a plurality of the sty according to the third aspect of the invention, as living quarters for animals and for collection and removal slurry from the sty.

The third aspect of the invention relates to the use of the device according to the first aspect of the invention at a sty for collecting and removal of slurry from said sty.

The fourth aspect of the invention relates to a device for use in collection and removal of slurry or similar from a sty, such as a pig sty, wherein the device comprises a one-piece body, having one or more funnels wherein each funnel comprises an upper opening having an upper horizontal area enclosed by an upper edge, a lower horizontal area enclosed by a lower edge, wherein the upper area is larger than the lower area, and the inside of the funnel is thus extending from the upper edge to the lower edge of the funnel, an encapsulation extending from the upper edge of the funnel to opposing parts of the upper edge of the funnel so as to allow the upper opening to be exposed, the encapsulation encloses the funnel so that a ventilation space is defined within the one-piece body between the encapsulation and the funnel.

Advantageously, the one-piece body provides a seamless and pre-fabricated one-piece device provides having a continuous structure which provides a hollow interior which is advantageously provides a built-in ventilation space for the device. A large portion of the device may advantageously be utilized as a ventilation space and furthermore the ventilations space may advantageously defined around the entire outside surface of the funnel, due to the encapsulation.

The encapsulation may preferably enclose the funnel, such that only the upper opening of the funnel is exposed to the outside of the device. In one or more embodiments, for substantially the entire upper edge of the funnel, the encapsulation extends from the upper edge of the funnel(s), underneath the funnel(s), to an opposing part of said upper edge of the funnel(s).

The device may initially, after fabrication and prior to use of the device in a slurry be a hollow structure comprising a ventilation space in the hollow interior fully enclosed by the encapsulation. In this version of the device, the funnel comprises an upper opening while being devoid of a lower opening and the funnel may therefore initially be regarded as bowl. This initial structure may be a result of the chosen method of fabrication of the device. In one or more embodiments, the device may be made by a rotational moulding process, where the hollow structure is created due to a dispersion of material within an enclosed mould. The one-piece body may preferably be made of plastic such as HDPE.

In one or more embodiments, the lower area comprises a lower opening, such that slurry or the like can flow through the upper opening, into the funnel and through the lower opening of the funnel. Additionally, the lower opening of the funnel may be configured to be connected with an outlet pipe.

The lower opening may be provided between the funnel and the ventilation space, preferably the lower edge of the funnel defines the periphery of the lower opening of the funnel. The slurry may be collected in the ventilation space, using an outlet pipe arrange din the ventilation space. The ventilation space is thereby defined between the encapsulation, the funnel and the outlet pipe.

In one or more embodiments, the outlet pipe may have an inclination (A2) from horizontal of at least 0.1%, preferably between 0.1%-0.5%, in the longitudinal direction arranged to promote a flow away from the lower openings of the funnels. The transportation of slurry may thereby be predetermined and controlled by providing the tilted arrangement of the outlet pipe. The outlet may preferably comprise outlet openings in the surface thereof in connection with the lower opening of the funnel so as to provide a sealed pathway between the funnel and the outlet pipe.

In one or more embodiments, the device comprises plate structure attached at one end to a first part the inner surface of the funnel and attached at a second end to a second part of the inside of the funnel so as to enclose a cavity between said plate structure and said enclosed part of the inside of the funnel, wherein the cavity is configured to be used as an air channel for directing fresh air supplied from the outside of the funnel to the inside of the funnel (3), through the cavity and towards the upper opening of the funnel. Fresh air may then be directed toward the heads of the animals, and improving the air quality for the animals.

The device may comprise any of the features and advantages according to the claims 3-14. The encapsulation may comprise protrusions on the side thereof, and it may comprise one or ventilation openings. Generally, the encapsulation may comprise any of the features and corresponding advantages according to the encapsulation described in relation to the first aspect of the invention. The funnel may be according to any features and advantages described in embodiments of the funnel according to the first aspect of the invention. Advantageously, the funnel shape allows for a quick and efficient discharge of slurry as well as minimizing the surface area of slurry which in turn minimized the evaporation of ammonia from the slurry.

In one or more embodiments, the maximum height of the device may be between approximately 0.7-2.0 m, such as between approximately 1.0-1.8 m or such as approximately between 1.2-1.6 m.

The invention further relates to the use of the device according to the fourth aspect of the invention at a sty for collecting and removal of slurry from said sty.

The fifth aspect of the invention relates to a method of installing a plurality of the device according to the fourth aspect of the invention in a sty opening at a sty, such as a pig sty, wherein the method comprises the steps of separating two sections of the encapsulation from the remainder of the encapsulation, so as to provide a through-going channel, placing the device in the sty opening, placing an outlet pipe in the through-going channel, wherein the outlet pipe comprises an outlet opening in the surface thereof, connecting said lower opening of the device with an outlet opening of an outlet pipe, such that a sealed pathway is created between the funnel and the outlet pipe, wherein said devices are placed side by side near the bottom of the sty opening, and wherein the method further comprises the step of connecting neighbouring through-going channels so as to provides a common ventilation channel.

connecting neighbouring outlet pipes, so as to provide a common outlet pipe.

The devices may be installed in a row, or in two rows adjacent to one another, such as arranged in parallel with separation distance between then. The separation distance may be utilized by placing a solid floor between two rows of sty areas. The devices may be installed at the sty area, such as under the floor level of a sty. The devices may be partly or fully enclosed by wall of the sty opening.

The majority of the devices within the sty may comprise two ventilation openings arranged in opposing parts of the encapsulation, so as to provide the through-going channel, which may be assembled with neighbouring through-going channels to create a common ventilation channel. The sections of the encapsulations may be arranged and fastening to the upper part of the device, so that they provide a cover for the ventilation holes, preventing slurry from entering said ventilation holes, and potentially blocking these.

For a device placed at an end of the row, only one section of the encapsulation may be removed, such that an end for the ventilation channel is provided. Additionally or alternatively the distal end of the ventilation channel may be connected to suitable ventilation means for providing a flow of air in the ventilation channel. Additionally the ventilation means may be arranged to extract air from the sty area through the ventilation holes and through the ventilation channel to a treatment facility were the air can be processed.

The outlet pipe may be placed in connection with the lower opening of the funnel, after or before the device has been placed in the sty opening. In one or more embodiments an outlet pipe may be provided for each funnel, and the outlet pipes may be connected to the selected funnels, prior to installment, such that the outlet pipes may only need to be connected to neighbouring outlet pipes in the sty opening. This provides for an easy and quick installment of the device, and further allows the connection between the funnel and the outlet pipe to be checked prior to lowering the device into the opening.

In one or more embodiments, the outlet pipe is placed so that it has an inclination (A2) from horizontal of at least 0.1%, preferably between 0.1-0.5%, in the longitudinal direction arranged to promote a flow away from the lower openings of the funnels.

Ventilation holes may be provided in the funnel, preferably at the upper edge of the funnel, such that air may flow from the sty area near the upper opening of the funnel to the ventilation space between the encapsulation, outlet pipe and the funnel and through the ventilation channel to the outside of the sty or to an air treatment facility. The ventilation holes may be provided at the manufacturing facility of the device, at the farm where the devices are to be installed prior to installment of the device, or after the device has been installed.

The sixth aspect relates to a sty comprising a plurality of the device according to the fourth aspect of the invention is installed in a sty opening of the sty using a method of installation according to the fifth aspect of the invention.

In one or more embodiments, the sty may comprise any of the features of the sty according to the third aspect of the invention together with said device according to the fourth aspect of the invention.

The invention also relates to a building comprising a sty according to the sixth aspect of the invention for animals, such as pigs. The sty may be used as living quarters for animals and for collection and removal slurry from the sty.

FIGURES

Aspects of the present disclosure will be described in the following with reference to the figures in which:

FIG. 1a shows a side view of a device according to the first aspect of the invention for collection and removal of slurry

DETAILED DESCRIPTION

The following detailed description describes a device 1, a sty with one or more devices and method for installing a device 1 by way of example and not by way of limitation.

Figure 1B:
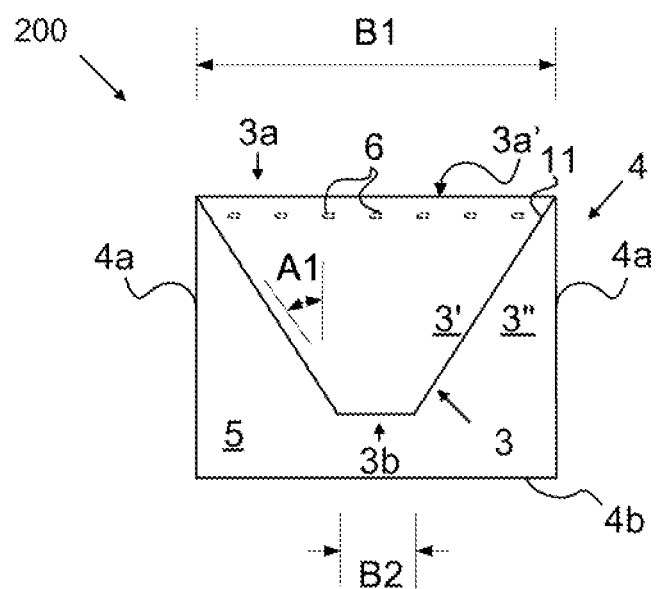
FIG. 1b shows a cross sectional view of a device according to the fourth aspect of the invention for collection and removal of slurry

An exemplary embodiment of device 1 according to the first aspect of the invention is shown in a side view in FIG. 1a. An exemplary embodiment of device 200 according to the fourth aspect of the invention is shown in a side view in FIG. 1b. The main difference between the two devices 1, 200 according to the present examples is that the one-piece body 2 according to the first aspect the encapsulation 4 is attached at the lower edge 3b' of the funnel 3 while the one-piece body 2 in the device 200 according to the fourth aspect the encapsulation 4 is not attached at the lower edge 3b' of the funnel 3 but instead extends from the upper edge 3a' of the funnel 3 below and around the funnel 3 and ends at the upper edge 3a' of the funnel 3.

In the present examples, the one-piece-body 2 of the devices 1, 200 is made by rotational moulding process, and both bodies 2 are fully hollow bodies, comprising fully enclosed interior space after exiting the mould. The one-piece bodies 2 may for example be made of High Density Polyethylene (HDPE) material. The funnel 3 of the device 1 according to the first aspect of the invention shown in FIG. 1a is provided with an upper opening 3a and lower opening 3b after the rotational moulding process. The mould can be viewed as fully enclosing a space in a similar way as a doughnut, with a middle through-going part, which results in a through-going channel, in the first aspect, a through-going channel providing the funnel 3. In FIG. 1a, the interior space of the device 1, is no longer fully enclosed since sections 7 of the encapsulation 4, has been removed. We will later describe the reasons for this removal. (A fully enclosed one-piece body 2 according to the first aspect of the invention can be seen in FIGS. 5 and 7).

The one-piece body 2 according to the fourth aspect of the invention as shown in cross-sectional view in FIG. 1b, initially, straight after fabricating the one-piece body 2 by rotation moulding, comprises a fully enclosed interior space and the funnel 3 does not comprise a lower opening 3b and the lower opening 3b therefore needs to be provided at the bottom of the funnel 3 prior to connecting the device 200 to an outlet pipe 8.

Figure 1C:
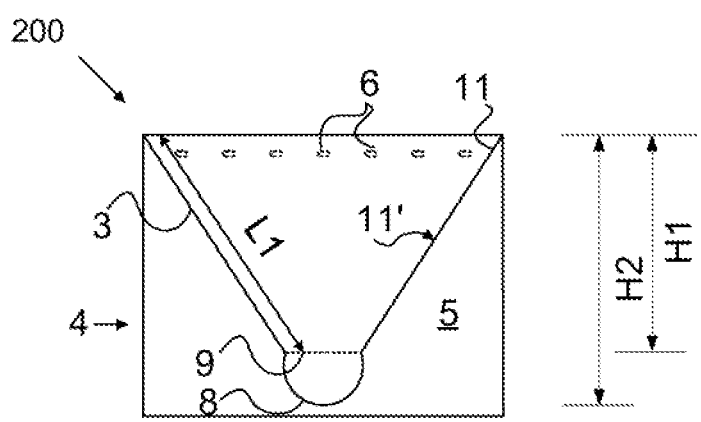
FIG. 1c shows a cross-sectional view of a device according to the fourth aspect of the invention comprising an outlet pipe.

FIG. 1c is shows a cross-sectional side view of a device 200 according to the fourth aspect of the invention, which further comprises an outlet pipe 8. The outlet pipe 8 is suitable for connection to other outlet pipes 8 or outlets to the outside of the housing. The encapsulation 4 shown has a ventilation opening 7 allowing the outlet pipe to be connected to a further outlet pipe 8 or to an outlet for the slurry, and such that the slurry and the ventilation air may be led away from the device 200. The ventilation opening 7 also allows the encapsulation 4 to be connected to further encapsulation 4 and thereby creating a ventilation channel 5' made by the joined ventilation spaces 5.

The funnels 3 of the devices according to aspects of the inventions, e.g. as shown in FIGS. 1a-c comprises an inside 3', defining the space enclosed by the funnel 3, and an outside 3", defining the space not enclosed by the funnel 3. The distance between the inside 3' and the outside 3" of the funnel 3 may be approximately 10 mm on average. The sides 4a of the encapsulation may generally be of at least the same thickness as the funnel 3. In one or more examples, the funnel 3 has an upper horizontal extent B1 which is larger than the lower horizontal extent B2. The upper horizontal extent B1 may be between 1.1-1.6 m in both width and depth and the lower horizontal extent B2 may be between 0.2-0.3 m, measured in the horizontal plane, when the device 1, 200 is installed in an opening 20. The funnel 3 according to any aspect of the invention may comprise an inside angle inclination A1 from the vertical plane of about 40-50 degrees. The funnel 3 may be made of a number of planar surfaces, which may preferably be approximately 1 m long, measured along the longitudinal axis of the planar surface.

In examples of the device 200, as shown in FIGS. 1b and 1s and the funnel 3 has a vertical extent (H1) of approximately only 1.0-1.2 m and the vertical extend (H2) of the funnel and the outlet pipe 8 connected to the funnel may approximately be between 1.2-1.6 m as indicated in FIG. 1c.

In the examples of the device 1, as shown in FIG. 1a the funnel 3 has a vertical extent (H1) of approximately only 0.8-1.3 m and the vertical extent (H2) of the funnel and the outlet pipe 8 connected to the funnel may approximately be at least 1 m, such as between 1.0 m and 1.7 m. As the outlet pipe to be connected with the device 1 may be partially installed under the ground level of the bottom of the sty opening 20, the total vertical extent (H2) may be quite large.

In one or more examples, the encapsulation 4 may have a range of different shapes, providing a range of different shapes of the ventilation space 5. In one or more examples, the encapsulation 4 may initially comprise at least a bottom 4b and one or more sides 4a, such as planar sides, extending from the edges of the bottom 4b of the encapsulation 4, such that a space directly above the bottom 4b of the encapsulation is enclosed. In one or more examples, the encapsulation 4 is of similar cross-sectional shape as the funnel 3. The encapsulation 4 may also be formed such that it fits into a pre-existing opening 20 in a sty floor.

The funnel of the device 1, 200 is enclosed by an encapsulation 4, such that a ventilation space 5 is defined within the one-piece body 2 between the funnel 3 and the encapsulation 4. In one or more examples, the device 1, 200 as shown in FIG. 1b-1c and FIGS. 2, 4 and 6 comprises a number of ventilation holes 6, which are arranged near the upper edge 3a' of the funnel 3. In one or more examples, the ventilation holes 6 may be arranged such that each side ii of the funnel 3 comprises at least one ventilation hole 6, and more preferably such that the ventilation holes 6 are evenly distributed with a suitable distance in between. Preferably, a higher number of ventilation holes 6 are provided near regions of the sty where a high content of ammonia in the air is expected. Ventilation holes 6 may be arranged along to opposing sides of the funnel 3. The encapsulation 4 encloses the funnel 3 such that air primarily flows between the ventilation holes 6, the ventilation space 5 and an outlet.

Figure 2:
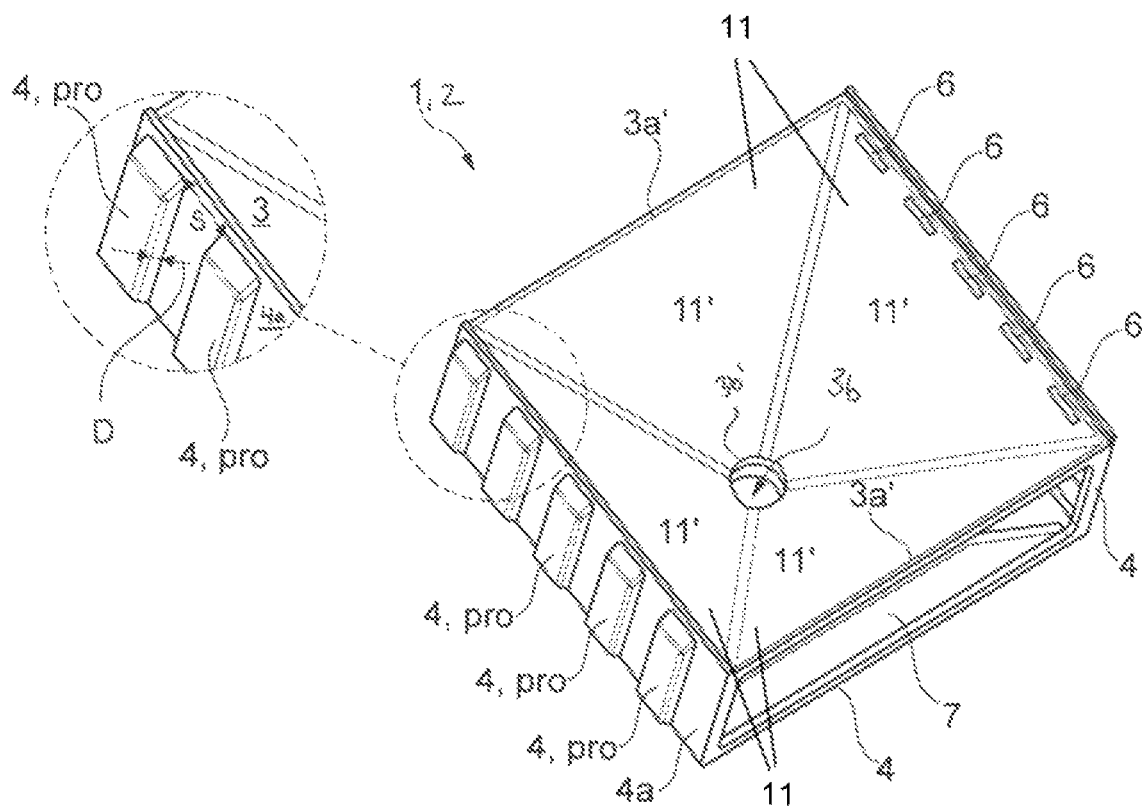
FIG. 2 shows the device of FIG. 1, shown in perspective mainly from above, with a zoomed in view of the protrusions on the side of encapsulation

FIG. 2 shows the device in FIG. 1a in another perspective, mainly as seen from above. The funnel is shown as comprising an upper edge 3a' enclosing an upper opening 3a and a lower edge 3b' enclosing a lower opening 3b. Additionally a number of ventilation holes 6 are arranged near the upper edge 3a' of the funnel 3 and along a part of the upper edge 3a'. It can also be seen that the encapsulation comprises a ventilation opening 7. In the present example, the horizontal area of the upper opening 3a is substantially quadratic and correspondingly the encapsulation has a horizontal cross-section which is also substantially quadric having four substantially vertical sides 4a at the upper part of the encapsulation 4. The encapsulation 4 comprises an array of protrusions 4, pro on opposing sides of the encapsulation, providing a gap 4, gap of a depth D measured from the tip of the protrusions to the surface of the encapsulation side 4a, as shown in the zoomed in view of a part of the protrusions 4, pro. The protrusions are spaced a distance S from each other, where S is substantially equal to ⅓-2 times the width of the protrusions. In the present examples, the protrusions are about 15 cm wide and the distance between them is also 15 cm. The depth D is approximately 7 cm. In the present examples the protrusions are shaped as elongated rectangular protrusions, but they may have any other shape providing the gap 4, gap from the tip of the protrusion to the surface of the encapsulation side 4a.

Figure 3:
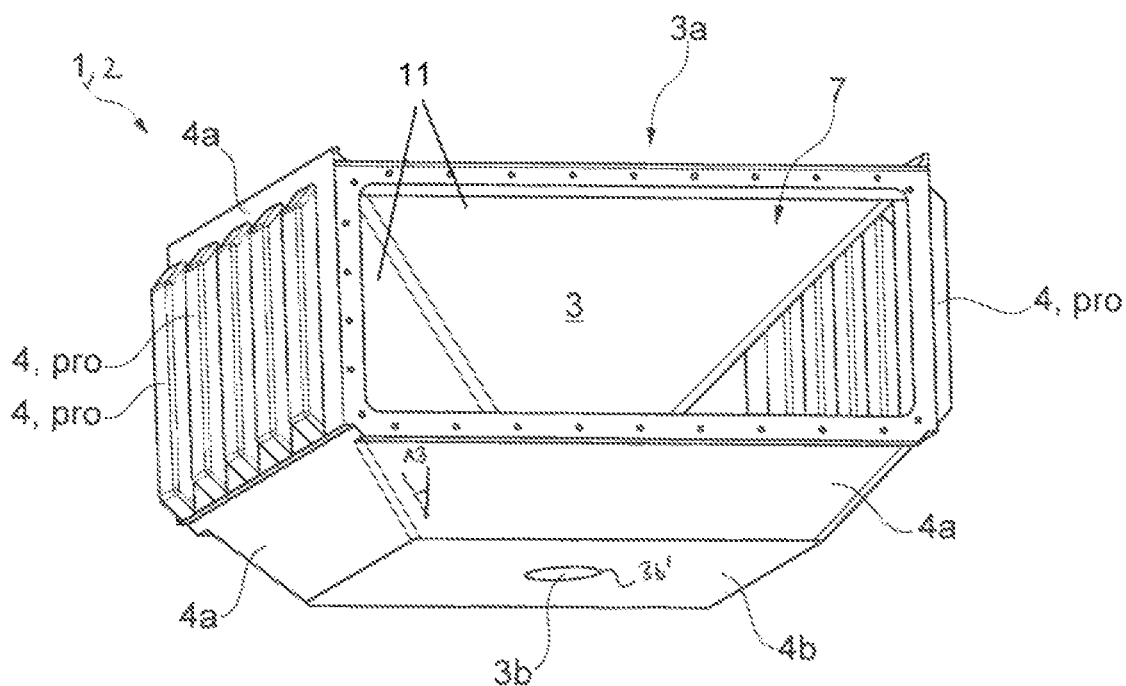
FIG. 3 shows the device as shown in FIGS. 1-2, seen in perspective mainly from the side.

FIG. 3 shows the device in FIG. 1a in another perspective, mainly as seen from below. The figures show the lower opening 3b of the funnel arranged in the bottom 4b of the encapsulation 4. It can be seen that the lower part of the encapsulation comprises sides 4a arranged at an inclination from vertical (A3), which features will be described in detail later. In the present example, the lower opening of the funnel is extended to the bottom of the encapsulation by a pipe section (not shown), of substantially equal diameter along the pipe section. The pipe section is in the present example, a part of the one-piece body manufactured by rotational moulding. In the present example, it can be seen that the interior of the protrusions are hollow, reducing the overall weight and material use for the one-piece body. They may alternatively be solid so as to provide an encapsulation which is more rigid.

The top view in FIG. 1-4 shows how the lower opening 3b of the funnel 3 is preferably centrally placed, such that the inclination toward the lower opening 3b is substantially the same around the inner circumference of the funnel 3. The funnel 3 may comprise four planar surfaces 11 arranged such that the funnel may be shaped as a frustum pyramid. Two neighbouring planar surfaces may not be of the same longitudinal and horizontal extent, such that the cross section of the funnel 3 in the horizontal plane is substantially rectangular.

Figure 5:
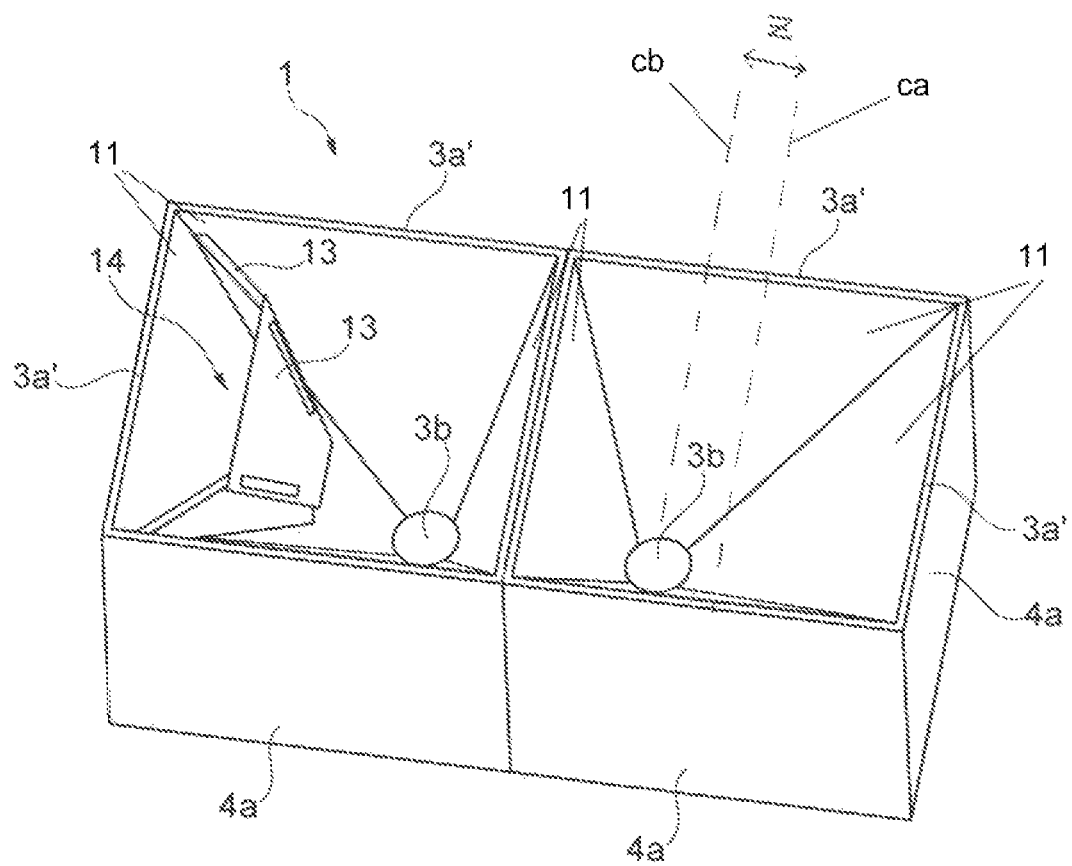
FIG. 5 shows a perspective view of two devices according to the invention arranged side-by-side, one device comprising plate structure creating a cavity.

In FIG. 5, the lower opening of the funnels are not centrally placed within the funnel, but instead the centre axis (cb) of the lower opening is shifted a distance Z laterally away from the centre axis (ca) of the upper opening of the funnel 3, providing a funnel 3 comprising inner surfaces of different inclinations (A1) from vertical. Steep parts allow fast discharge of slurry while more horizontal parts can be used under less slurry filled parts of the sty.

FIG. 5 additionally shows cavity 14 enclosed by plate structures in one of the two funnels 3, at the more flat and more horizontally orientated side ii of the funnel 3. An air supply opening(s) 25 (not shown) is provided in the funnel 3, in the funnel part enclosed by said structure, so as to provide fresh air from the ventilation space 5 to pails of the sty floor through the air supply opening and the cavity 14 provided in the device 1, 200. The air supply opening may be connected to air supply means by tubes for containing and transporting said fresh air, connected directly to air supply openings. From the air supply opening, the air may be further directed towards a specific area of the sty by means of a cavity 14, which in the present example is created using plate structures.

In one or more examples according to the invention, the device 1, 200 comprises a plurality of funnels 3, made by a single rotation moulding process. The mould used in the process is designed to produce a device 1, 200 having two funnels 3. The device 1, 200 may also comprise more than two funnels 3. The encapsulation 4 may be fabricated to enclose more than one funnel 3.

Figure 4:
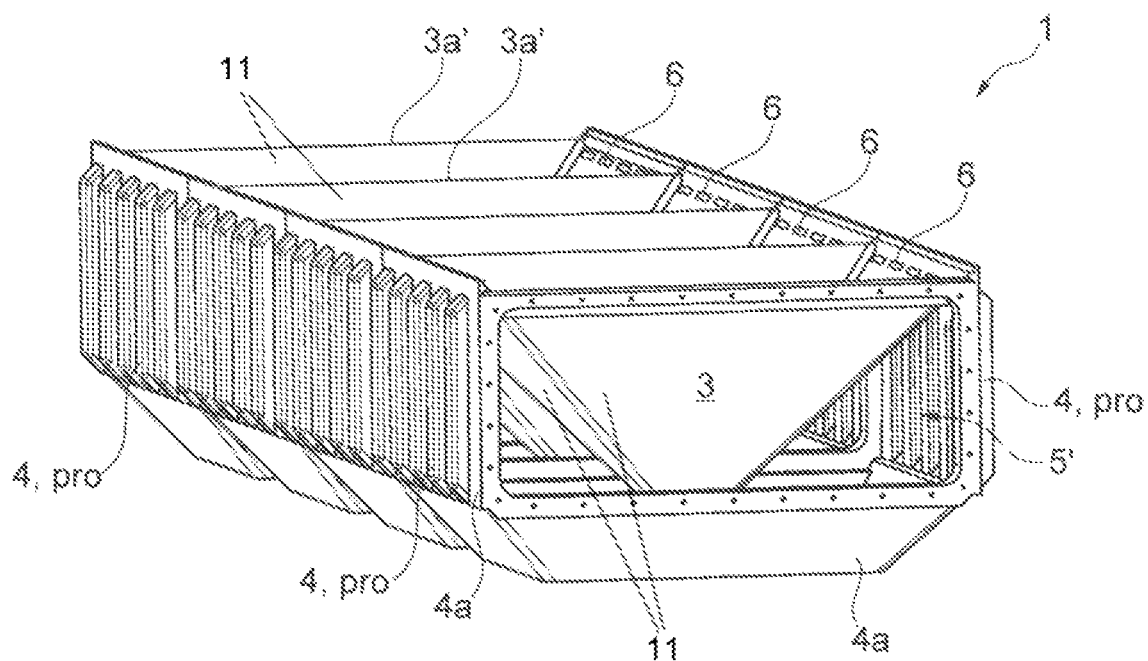
FIG. 4 shows a perspective view of a plurality of a device according to the invention arranged in a row and providing a common ventilation channel
Figure 6:
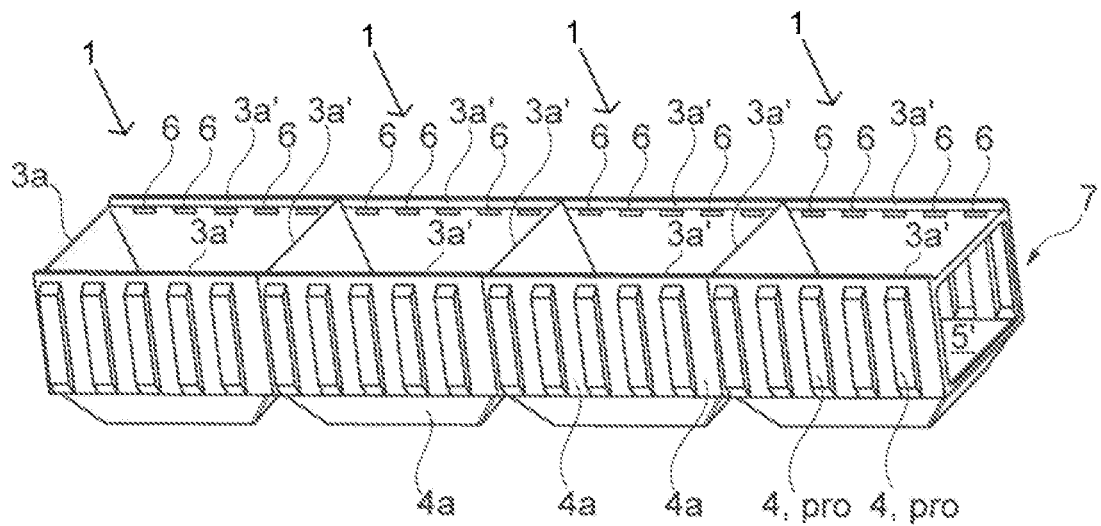
FIG. 6 shows a perspective view of a row of devices according to the invention.

FIG. 4 and FIG. 6 shows examples of the present invention wherein a plurality of devices 1 according to the first aspect of the invention are arranged side-by-side in order to create a row of devices 1. Additionally the plurality of encapsulations 4 may be connected to neighbouring encapsulations 4. The plurality of the encapsulations 4 may be connected by connecting the abutting edges of the encapsulations 4 to form a closed ventilation channel 5. The last encapsulation 4 in the row may comprise a wall enclosing the end 4b of encapsulation 4 such that the ventilation channel 5 is further enclosed. The lower openings 3b of each funnel 3 are interconnected by being connected to the same outlet pipe 8 or pipe unit (not shown). The neighbouring funnels 3 may be interconnected by using cover element, such as substantially V-shaped cover elements attached to the inner surface of each funnel. Alternatively or additionally the neighbouring parts of the funnels may be welded together. A plurality of devices 200 according to the fourth aspect of the invention may be arranged in a similar way with neighbouring funnels 3, neighbouring encapsulations 4 and neighbouring outlet pipes 8 interconnected.

Figure 7:
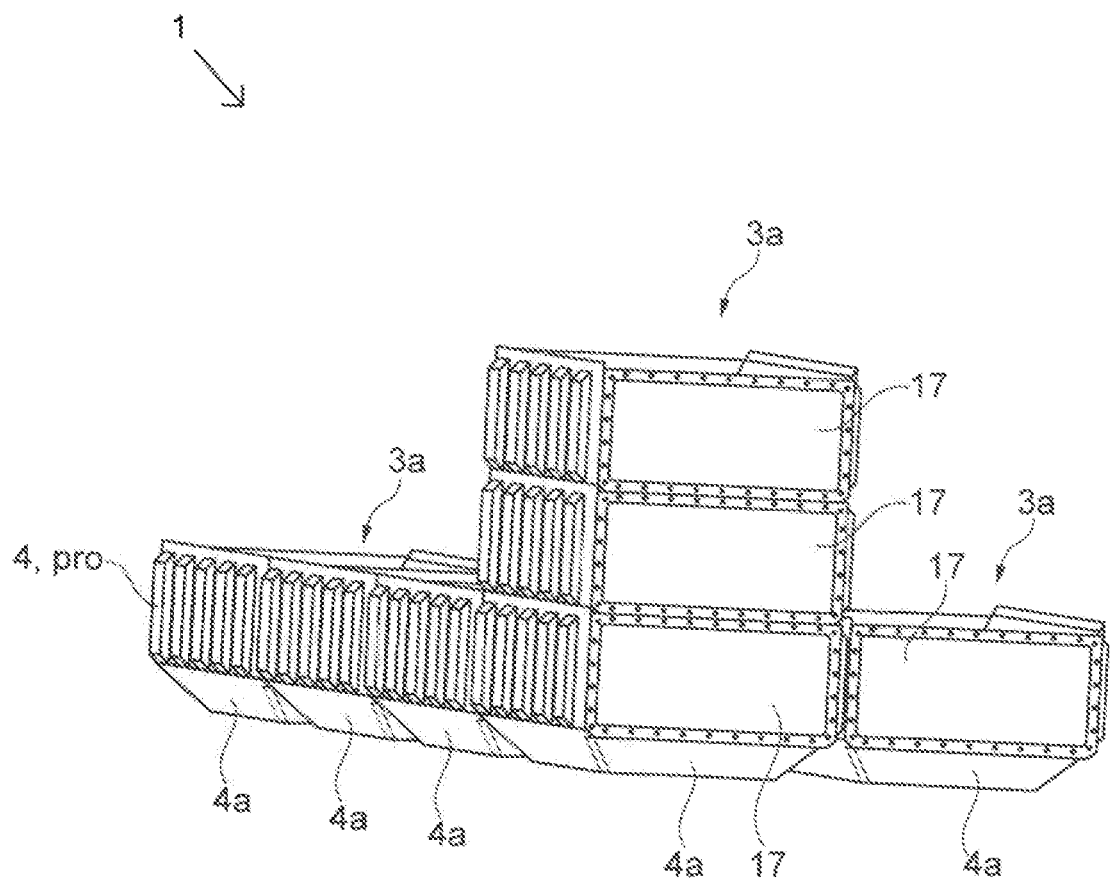
FIG. 7 shows a perspective view of a storage configuration for a plurality of devices according to the invention.

FIG. 7 shows an example of a storage configuration of a plurality of the devices according to the first aspect of the invention. The present example shows how the devices 1 may be stored after fabrication by rotational moulding, for example at the fabrication facility or in a transportation vehicle. The devices 1 comprises are shown comprising the one-piece bodies each having a funnel 3 and an encapsulation 4 which together fully enclose an interior space 5 between them. A lower part of the encapsulation 4, in the present example approximately ⅓ of the encapsulation adjacent from the bottom of the encapsulation 4b comprises sides 4a which has an angle of inclination from vertical (A3) (i.e. steeper, see FIG. 3) which is smaller than the inclination from vertical (A1) of the inner sides if of the funnel 3, such that when the devices 1 are placed on top of each other, the lower part of the encapsulation 4 can extend into the upper part of the funnel 3, thereby the reducing the overall height of the stacked devices 1. In one or more examples, the horizontal extent of the lower part of the encapsulation 4 may be smaller than the horizontal extent of the inside of the upper part of the funnel 3, so that the lower part of the encapsulation fits into the upper part of the funnel 3. In one or more examples, the funnel may comprise different angle of inclinations (A1) and correspondingly the encapsulation may also comprise different angle of inclinations, or a uniform angle of inclination being smaller than the all angles of inclinations (A1) of the sides 11 of the funnel 3. Similarly the encapsulation 4 of the devices 200 according to the fourth aspect of the invention may be shaped at a lower end such that the lower end of the encapsulation can be displaced inside an upper part of the funnel, so as to stabilize the device 200 but also so as to decrease the total space filled by the devices 200 when stored and/or transported.

Figure 8:
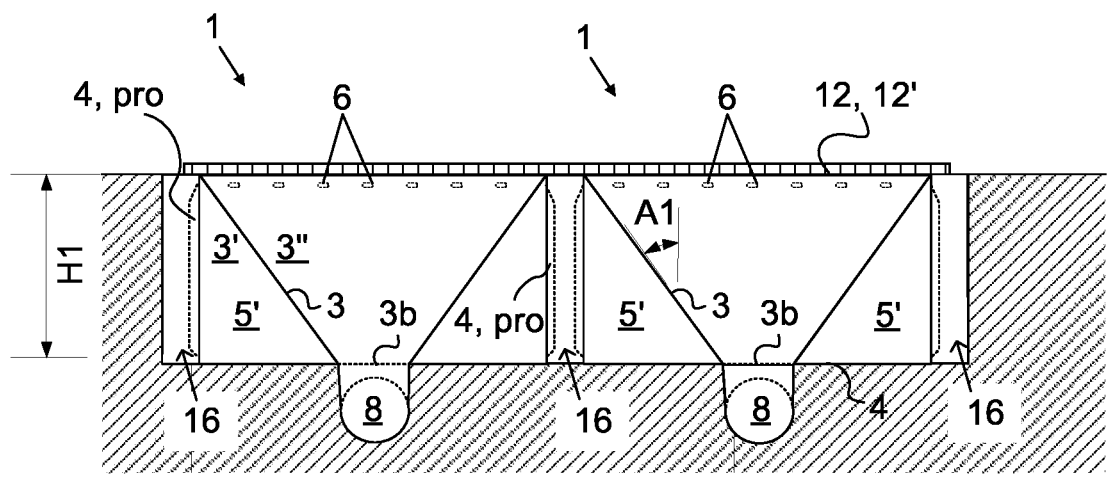
FIG. 8 shows a cross-sectional view of two rows of devices according to the first aspect of the invention arranged with rigid structures.

FIG. 8 shows a cross-section of two rows of devices 1 as shown in FIG. 1a, installed side by side, each row of the sty comprises a ventilation channel 5' made up of the ventilations spaces 5 within that row. The devices 1 comprises protrusions 4, pro of the sides of the encapsulation 4a facing the spacing between the devices 1, separating the rows. The space between the devices 1 have in the present example, been filled with concrete so as to provide rigid structures 16 between the devices. The concrete fix the devices 1 in their intended position relative to each other and preferably also in their position in the opening 20 of the sty. The opposite side 4a of each encapsulation also comprises protrusions 4, pro which are shown to create a minimum distance between the encapsulation side 4a and the side wall of the opening 20. The gap 4, gap created is may also be filled with concrete, creating rigid structures 16 so as to substantially secure the device 1 in said opening 20. The rigid structures 16 may support a floor 12 placed over the devices 1 and resting on the rigid structures 16, such that the structures 16 support the weight and the load on the floor 12. A floor 12 comprising a plurality of through holes 12', through which the slurry can pass into the funnels 3. The floor is preferably placed over the upper opening of at least one funnel 3 and on at least two rigid structures 16. The upper surfaces of the rigid structures 16 are wide enough to accommodate supporting more than one floor 12 simultaneously.

The lower opening 3b of the funnel 3 is suitably connected to an outlet pipe 8 below the device 1, in the present example the connection is made via a pipe section extending from the lower opening 3b to the outlet pipe. The sealed pathway from the funnel 3 to the outlet pipe 8 may be made by welding the outlet pipe 8, pipe section and lower edge 3b' of funnel together.

The angle of inclination from vertical (A1) of the inner sides 11' of the funnel 3, between 40-50 degrees, enables slurry to enter be transferred to the outlet opening in an efficient manner and additionally progressively the surface are of slurry is reduces as the slurry enters the outlet pipe. Additionally, air may extracted from the holes 6 through the ventilation channel, reducing the ammonia content near the inside of the funnel 3".

Figure 9:
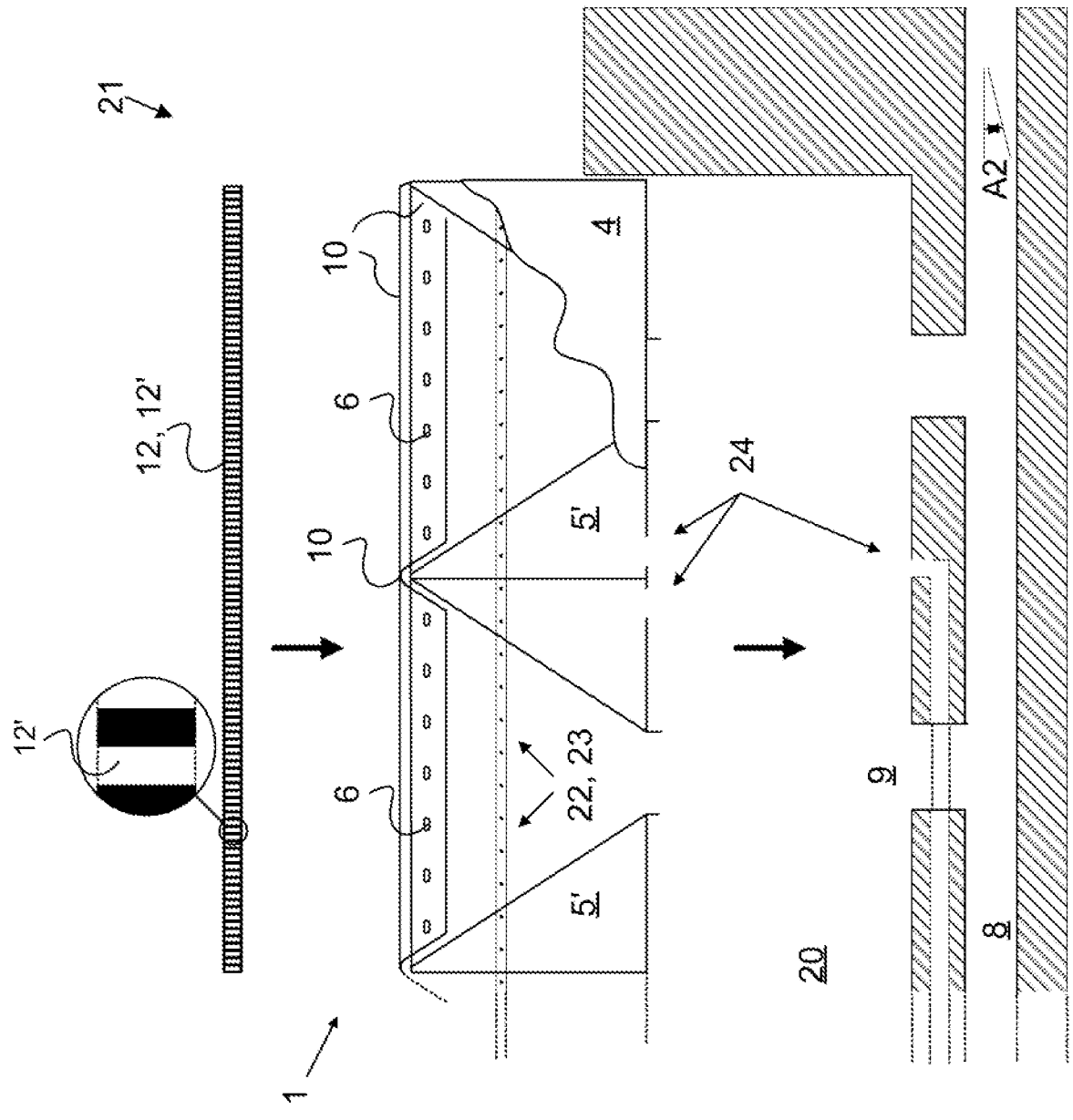
FIG. 9 shows a device according to the first aspect of the invention installed in a sty opening.
Figure 10:
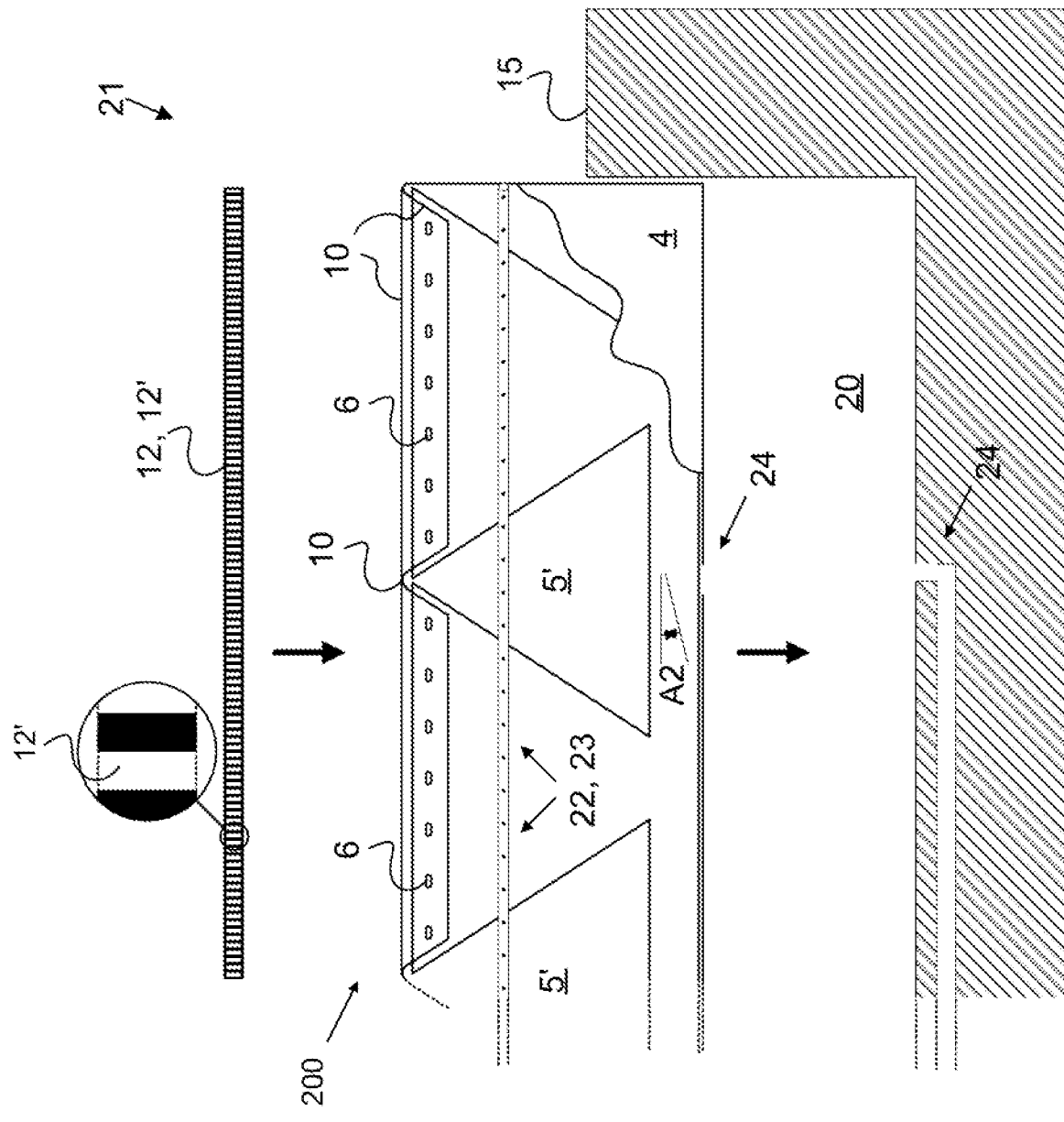
FIG. 10 shows a device according to the fourth aspect of the invention installed in a sty opening.

FIG. 9 and FIG. 10 shows two examples of a device 1 according to the first aspect of the invention and a device 200 according to the fourth aspect of the invention, respectively, installed in an opening 20 at the sty floor. The dashed lines indicate that further devices 1, 200 in addition to the device 1, 200 shown may be connected to or placed adjacent to. The encapsulations made of HDPE provide the necessary support for the enclosing the ventilation spaces 5, funnels 3, and for the device according the fourth aspect of the invention also the outlet pipes 8. The device 1, 200 is connected to at least one outlet pipe, which may preferably have a downwards inside angle of inclination A2 from horizontal of approx. 0.2%, such that the slurry from the respective funnels 3 will tend to travel in the same direction.

In one or more examples, the outlet pipe 8 may be of any suitable material and approximately 250 mm in diameter, with at least one surface opening 9 arranged along the length of the outlet pipe 8, which can be connected to the lower opening 3b of the funnel 3 as shown in FIGS. 1c-d and 10 or connected to lower openings 3b' of the funnel 3 via intermediate pipe sections as shown in FIG. 8-9. The connection is made by gluing or welding and provides a sealed pathway for the slurry such that no slurry can enter the ventilation space 5.

In one or more examples, a cover element 10, e.g. made from the section of the encapsulation 17 removed from the device, may be attached to the device 1, 200, above the ventilation holes 6 near or at the upper edge 3a' of the funnel 2, and such that a distance is created between the cover element 10 and the ventilation holes 6. This distance may be 1-7 cm such as 2-4 cm wide and allow for air from the inside 3' of the funnel 3 to reach and enter through the ventilation holes 6 and such that slurry is prevented from entering the ventilation holes 6 from above. An exemplary cover element 10 is shown in FIGS. 9 and 10.

As shown in FIGS. 9 and 10, the assembled system 21 comprises a plurality of ventilations spaces 5, which forms a ventilation channel 5'. In connection to this ventilation channel 5', ventilation means (not shown), cleaning means 22, drainage means 23 and an air treatment system (not shown) may be installed. The ventilation means may comprise one or more blowers and may preferably be arranged such that the, when in use, air will be withdrawn from the funnels 3 and discharged at an outlet in the ventilation channel 5'. Here the air may be collected and treated such that contaminants within the air, in particular ammonia, can be removed. The system 21 may alternatively comprise an air treatment system (not shown), which can treat the air prior to the outlet. The air treatment system may comprise a vapour spray, which is arranged to spray a liquid containing sulfuric acid into the ventilation channel 5'. This spray is most efficient when arranged such that a large area of the ventilation channel 5' is treated. The sulfuric acid will capture the ammonia in the air in the liquid, which can then be discharged, for example by using drainage 15 and suction means. It is preferred that the air is sufficiently cleaned such that it may be released to the outside environment without further treatment. This air treatment system may be a part of the prefabricated parts from which the system 21 in constructed. The cleaning means 22 may comprise a hose 23 which is preferably installed near a distance corresponding to approximately halfway between a bottom and a top of the ventilation channel 5', such that a large area of the ventilation channel 5' may be cleaned, by having the hose 23 spray water down the inside surfaces enclosing the ventilation channel 5'. Preferably the cleaning means 22 are fixed to the encapsulation 4. The encapsulation 4 may additionally comprise drainage means 24 in the bottom 4b part of the encapsulation 4, such that the liquid can be drained from the ventilation channel 5'. The cleaning 22, 23 and drainage means 24 may be installed in each device 1, 200, or in one of the device 1, 200, prior to installation and assembling the devices 1, 200 into a system 21. One or more rows of devices 1, 200, i.e. such as one or more systems 21 may be installed in an opening 20 of a sty.

Additionally, or alternatively air supply means may be installed in the system 21, so as to provide fresh air from to parts of the sty floor through some ventilation holes 6, or an air supply opening provided in the device 1, 200, such as in the funnel 3. Tubes for containing and transporting said fresh air, may be connected directly to said holes 6 or air supply openings and extend to a compressor unit, blowing unit, ventilation unit, pump or similar capable of providing fresh air through the tube. From the ventilation hole 6 or the air supply opening or both, the air may be further directed towards a specific area of the sty by means of a cavity 14 enclosed by structure, such as a plate structure limiting the spacial extent of the air volume.

The present invention also relates to methods of installing the devices 1, 200 at a sty, in an opening 20 at the sty. The device 1 is manufactured in prefabricated parts such that it can be readily installed in an opening 20. The bottom of the opening 20 may of sand or the like and sufficiently solid to accommodate the placement of the devices 1, 200. The device 1 may merely be placed on the bottom of the opening 20 upon installation, which adding any further support means as the device is self-supporting. Common for both aspects of the device 1, 200, the lower opening of the funnel 3b and the ventilation space 5 connected to suitable outlet means.

In one or more examples, the device 1 according to the first aspect of the invention is installed using a method of first providing a common outlet pipe 8 under the bottom level of the sty opening 20, where the outlet pipe 8 comprises pipe section extending upwards from the outlet pipe 8 to the bottom level of the opening 20. The outlet pipe may be at least partly buried by sand or gravel. One or more ventilation openings 7 and ventilation holes 6 are made in the encapsulation 4 of at least the majority of the devices 1 so that air can travel between the outside of the devices 1 and the ventilation space 5. The pipe sections have outlet openings 9 to which the outlet pipe 8, to which pipe sections the funnels are connected, for example by gluing or welding or by using a coupler, which allows a leak free transportation of slurry to the interior of the outlet pipe 8 through the pipe section and the outlet opening 9. When the devices 1 are connected to the pipe-sections, the bottom of the encapsulation 4 may be resting or balanced on the bottom of the opening 20 e.g. the material at least partially placed over the outlet pipe, placed in the opening 20. The devices 1 are lowered in the opening 20, and installed in a row, where ventilation opening(s) 7 of the device 1 are facing one another, in order to create a common ventilation channel 5'. The adjacent part of the encapsulation, facing the sides of the opening 20 of neighbouring separate rows of devices may be arranged at a minimum distance D due to protrusions on the side of the device 1. This space may be filled to e.g. further retain the position of the devices 1 in the openings 20. The neighbouring ventilation openings 7 may be connected to create an enclosed air duct between the devices 1, e.g. by gluing abutting parts of the encapsulation 4 situated adjacent to the ventilation openings 7. Cover elements 10 are installed to cover ventilation holes 6, which are exposed by a later placed slatted sty floor 12. One or more floors 12 are thereafter installed over the devices 1 in order to provide a floor of the sty.

In one or more examples, a device 200 according to the fourth aspect of the invention, made by rotational moulding an fabricated without a lower opening 3b in the funnel 3, may be provided with such lower opening 3b any time prior to connecting the funnel 3 of the device 200 with an outlet pipe 8. The connection may be e.g. provided at the manufacturing facility, the farm where the device 200 is to be installed or in the opening 20 of the sty. The methods for installing the device 200 is therefore not limited to where the and when the lower opening 3b is provided and additionally not to when and where other additional features are added or provided to the devices, such as ventilation holes, ventilation openings and plate elements etc. The same applies to the device 1 according to the first aspect of the invention.

In one or more examples, a device 200 according to the fourth aspect of the invention may be installed using a method of first providing one or more ventilation openings 7 and ventilation holes 6 in the one piece body 2. Providing a lower opening 3b near the lowermost part of the funnel 3, placing an outlet pipe 8 inside the ventilation space enclosed by the one-piece body and connecting an outlet pipe 8 to the lower opening 3b, for example by creating a surface opening 9 the outlet pipe 8 and connecting the rim of said surface opening 9 to the lower edge of the lower opening 3b. Place the devices 200 on the bottom of a sty opening 20 and creating a row of devices 200. The devices are placed such that the ventilation openings 7 are facing each other, and these may be sufficiently sealed together or fastened together, so as to create a ventilation channel 5' in the row. Filling gaps between the encapsulation 4 and the side of the openings 20 or neighbouring rows of devices 1, 200. Place cover elements 10 over the ventilation holes in order to protect the ventilation channel 5' from being contaminated by slurry and placing floors 12 over the row of devices 200. Alternatively, or additionally, all or some of the connections between outlet pipe 8 and funnel 3 may be provided in the sty opening 20.

In one or more examples, the device 1, 200 according aspects of the invention is provided with a number of ventilation holes 6 near the surface thereof and covered by a cover element 10 made from a part of the encapsulation 4 cut off from the side of the encapsulation 4a when providing a ventilation opening 7. The cover element 10 can be attached on the inside of the funnel, with a separating piece of material such that the ventilation holes 6 are not closed off by the cover element 10. An outlet pipe having an opening 9 in the surface thereof is connected to the provided lower openings 3b of the funnel. A number of funnels 3 may be connected to the same outlet pipe 8 or connected to individual outlet pipes 8 and thereafter outlet pipes 8 may be connected in the sty opening 20 so as to create a common outlet pipe for each row of devices. The encapsulations 4 are also arranged and/or connected to form a common ventilation channel 5' for each row. Sections of the rows may be assembled prior to lowering it in the opening 20.

The method of installation of the devices 1, 200 only requires a relative shallow opening 20 in the sty in order to fully contain the row of devices being a part of the system 21. The opening 20 may be provided upon installation or it may be a pre-existing opening, for example a slurry pit. Upon installation of the systems 21, the outside surface of the encapsulations 4 may be facing the neighbouring inside surface of the sty opening 20 or neighbouring devices, being part of the same row of the devices 1, 200 or a neighbouring row of devices 1, 200. For the parts of the encapsulation directed towards neighbouring rows of the devices 1, 200 of the side wall of the opening 20, gaps naturally existing or provided by protrusions 4, pro on the side of the encapsulations 4a may be filled with any suitable filling material, such as gravel or sand which need not be shape stabile like concrete. A floor 12 may be placed over the funnel, for the animals to move around on and allow slurry to enter said device 1, 200. The floor 12 may be supported by the filling material between the encapsulations 4.

Preferably there will be a vertical gap between the top of the device 1 and the level of the sty floor, so that when a grid floor 12 is placed on top, the top of the grid floor will be substantially level with the sty floor. Substantially level refers to within 0-2 cm, such that the animals in the sty are comfortable walking from a solid floor 15 to a grid floor 12.

The outlet pipes 8 are connected to outlets provided to the outside of the animal housing or building where the slurry and waste may be stored or treated. The ventilation spaces or channels 5, 5' are connected to one or more ventilation systems and the air can be transferred from the ventilation spaces or channels 5, 5' to the outside of the housing through one or more ventilation openings or to an air treatment facility.

LIST OF REFERENCE NUMERALS 1, 200 Device
2 One-piece body
3 Funnel
3' Inside of the funnel
3" Outside of the funnel
3a Upper opening of the funnel
3a' Upper edge of the funnel
3b Lower opening of the funnel
4 Encapsulation
4a Side of the encapsulation
4b Bottom of the encapsulation
4, pro Protrusion on side of encapsulation
4, gap Gap
5 Ventilation space
5' Ventilation channel
6 Ventilation holes
7 Ventilation opening
8 Outlet pipe
8 Outlet opening
9 Cover elements
10 Sides of the funnel
11' Inside surface of the sides of the funnel
12 Floor
12' Holes within the floor
13 Plate structure
14 Cavity
15 Solid floor e.g. concrete floor
16 Rigid structure
17 Section of encapsulation
20 Sty opening
21 System
22 Cleaning means
23 Hose
24 Drainage means
A1 Inside angle of inclination of inside surface from vertical
A2 Inside angle of inclination from horizontal of the pipe unit
A3 Inside angle of inclination from vertical of the lower side part of the encapsulation
B1 Upper horizontal extent of the funnel
B2 Lower horizontal extent of the funnel
H1 Vertical extent of the funnel
H2 Vertical extent of the discharge section
ca Centre of the upper opening
cb Centre of the lower opening
Z distance from centre of upper opening
D distance between tip of protrusion and outer surface of encapsulation
S distance between the protrusions

The invention claimed is:

1. A device for use in collection and removal of slurry or similar from a sty, wherein the device comprises a one-piece body made by a rotational moulding manufacturing process, wherein the one-piece body has
    one or more funnels wherein each funnel comprises at least one upper opening having an upper horizontal area enclosed by an upper edge, and a lower opening having a lower horizontal area enclosed by a lower edge, wherein the upper horizontal area is larger than the lower horizontal area, and the inside of the funnel is thus extending from the upper opening to the lower opening of the funnel, wherein each funnel comprises one or more ventilation holes arranged near the upper edge of the funnel,
    an encapsulation enclosing each funnel from the lower edge of the funnel to the upper edge of the funnel, such that a ventilation space is defined within the one-piece body between the encapsulation and the funnel, wherein the ventilation space is defined around the entire outside surface of the funnel due to the encapsulation, and wherein at least some of the one or more ventilation holes are covered by one or more cover elements so as to prevent slurry or similar from entering the ventilation space through the one or more ventilation holes.

2. The device according to claim 1, wherein the lower opening is configured to be connected to an outlet pipe, such that a sealed pathway for slurry is provided from the funnels to the outlet pipe.

3. The device according to claim 1, wherein the device comprises at least one ventilation opening in the encapsulation providing a pathway through which air can flow between the inside of the funnel through the one or more ventilations holes and to the ventilation opening.

4. The device according to claim 1, wherein the device is made of a plastic material comprising High Density Polyethylene (HDPE) material.

5. The device according to claim 1, wherein the funnels comprises an inner surface of an angle of inclination from vertical A1 in the range of 30-60 degrees.

6. The device according to claim 1, wherein the one-piece body comprises at least two funnels and wherein the funnels are arranged side by side such that at least a part of the upper edge of the first funnel is neighbouring at least a part of the upper edge of the second funnel.

7. The device according to claim 1, wherein the encapsulation comprises a plurality of protrusions on the outer surface thereof for maintaining a gap of a minimum distance between the outer surface of the encapsulation and neighbouring elements.

8. The device according to claim 1, wherein the maximum width of said device comprising a single funnel is approximately between 1.0-1.8 m.

9. The device according to claim 1, wherein the maximum height of the device is between approximately 0.7-1.8 m.

10. The device according to claim 1, wherein the device comprises a plate structure attached at one end to a first part the inner surface of the funnel and attached at a second end to a second part of the inside of the funnel so as to enclose a cavity between said plate structure and said enclosed part of the inside of the funnel, wherein the cavity is configured to be used as an air channel for directing fresh air supplied from the outside of the funnel to the inside of the funnel, through the cavity and towards the upper opening of the funnel.

11. A method of installing a plurality of devices according to claim 1 in a sty opening at a sty, wherein the method comprises the steps of
    installing an outlet pipe in the sty opening, and
    connecting said lower opening of each funnel with an outlet pipe, such that a sealed pathway is created between the funnel and the outlet pipe,
    placing said plurality of devices side by side near the bottom of the sty opening.

12. The method according to claim 11, wherein the method further comprises the steps of
    removing a portion of a lateral side of the encapsulation for each device, so as to provide a ventilation opening,
    providing the one or more ventilation holes near the upper edge of the funnel of at least some of said devices, so that air may be transported between the sty and the ventilation space,
    placing said plurality of devices side by side near the bottom of the sty opening such that a ventilation channel comprising the ventilation spaces of said devices is provided.

13. The method according to claim 12, wherein the method further comprises the step of
    attaching a part of said section of the encapsulation near said upper edge of the funnel such that said section of the encapsulation covers at least some of said one or more ventilation holes of the device.

14. The method according to claim 11, wherein the method further comprises the step of
    connecting said devices by means of suitable fastening methods, such as to provide a substantially sealed ventilation channel.

15. The method according to claim 11, wherein the encapsulation comprises a plurality of protrusion on the outer surface thereof, which provides a gap of minimum distance D between the outer surface of the encapsulation and neighbouring elements when installed at a sty, and
    wherein the method comprises the step of filling the gap with material, in order to provide a rigid structure and so as to fix the device in the installed position.

16. The method according to claim 15, wherein the method comprises the step of
    placing at least one floor having a plurality of through holes over the upper opening of the funnels of said devices, such that the at least one floor is supported by at least some of the rigid structures such that the weight of the floor and the load on the floor are transferred to the rigid structures.

17. A sty for animals, wherein the sty comprises a device according to claim 1 installed in a sty opening of the sty.

18. The sty according to claim 17, wherein at least some of said devices are covered by at least one floor having a plurality of through holes and placed over the upper opening of the funnels of said devices.

19. A system for a sty, comprising the device according to claim 1 and ventilation means, wherein the ventilation means are arranged to provide a flow of air between the inside of the funnel and the ventilation space through the one or more ventilation holes.

20. The system of claim 19, wherein the device comprises at least one ventilation opening in the encapsulation for allowing air to flow between the one or more ventilation holes and the at least one ventilation opening, through the one or more ventilation holes and the ventilation space.

* * * * *